Dec. 19, 1939.    M. L. NELSON ET AL    2,183,820
RECORDING SYSTEM
Filed Nov. 16, 1935    19 Sheets-Sheet 1

INVENTORS:
MARTIN L. NELSON
LEITH JOHNSTON
BY
ATTORNEY.

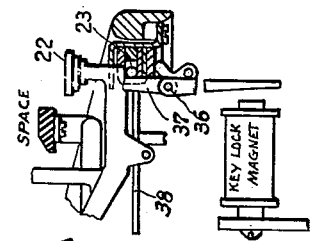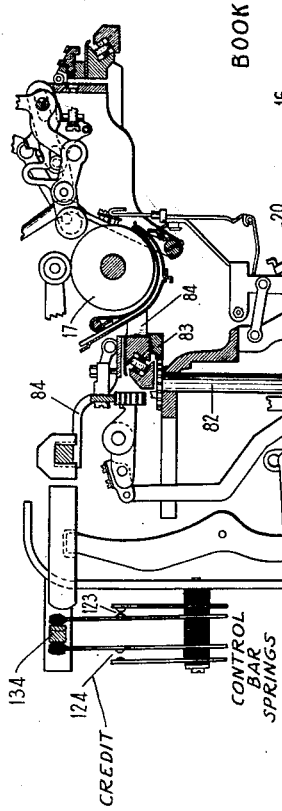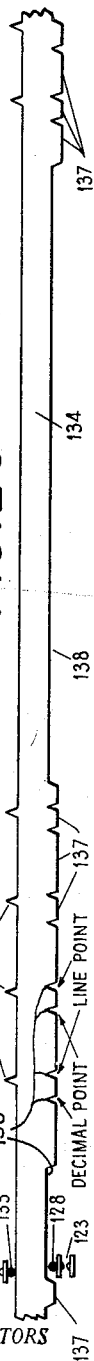

Dec. 19, 1939.   M. L. NELSON ET AL   2,183,820
RECORDING SYSTEM
Filed Nov. 16, 1935   19 Sheets-Sheet 3

INVENTORS:
MARTIN L. NELSON
LEITH JOHNSTON
BY
ATTORNEY.

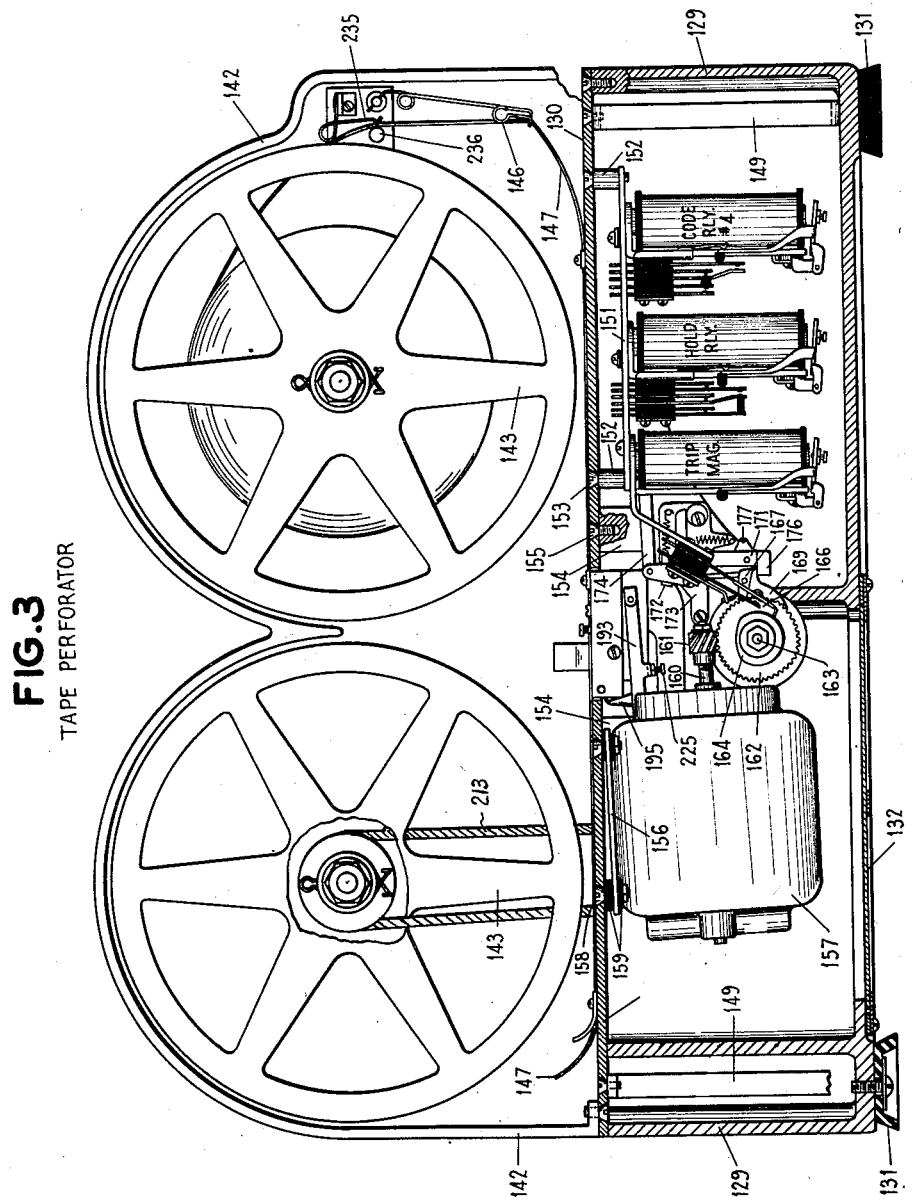

Dec. 19, 1939.    M. L. NELSON ET AL    2,183,820
RECORDING SYSTEM
Filed Nov. 16, 1935    19 Sheets-Sheet 5
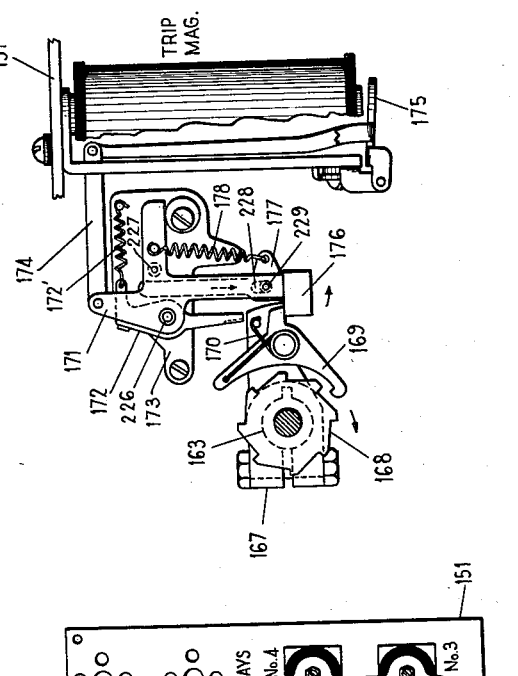
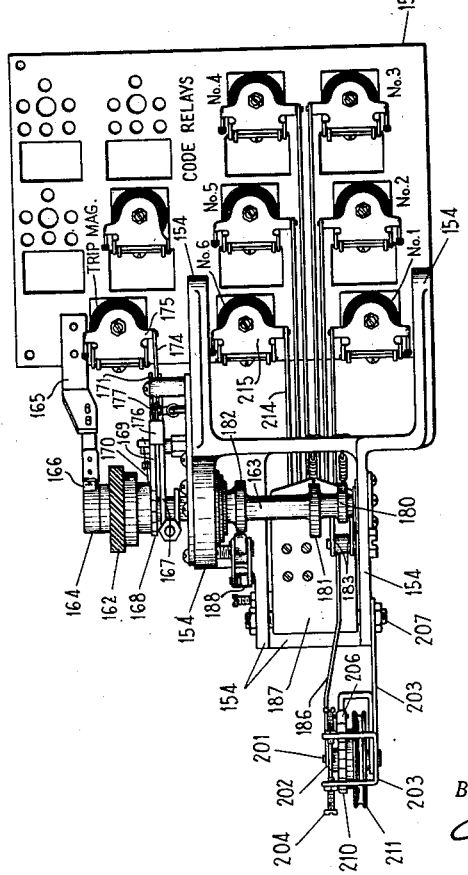
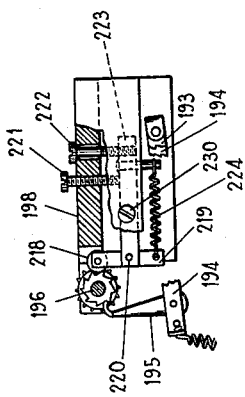
INVENTORS
MARTIN L. NELSON
LEITH JOHNSTON
BY
ATTORNEY.

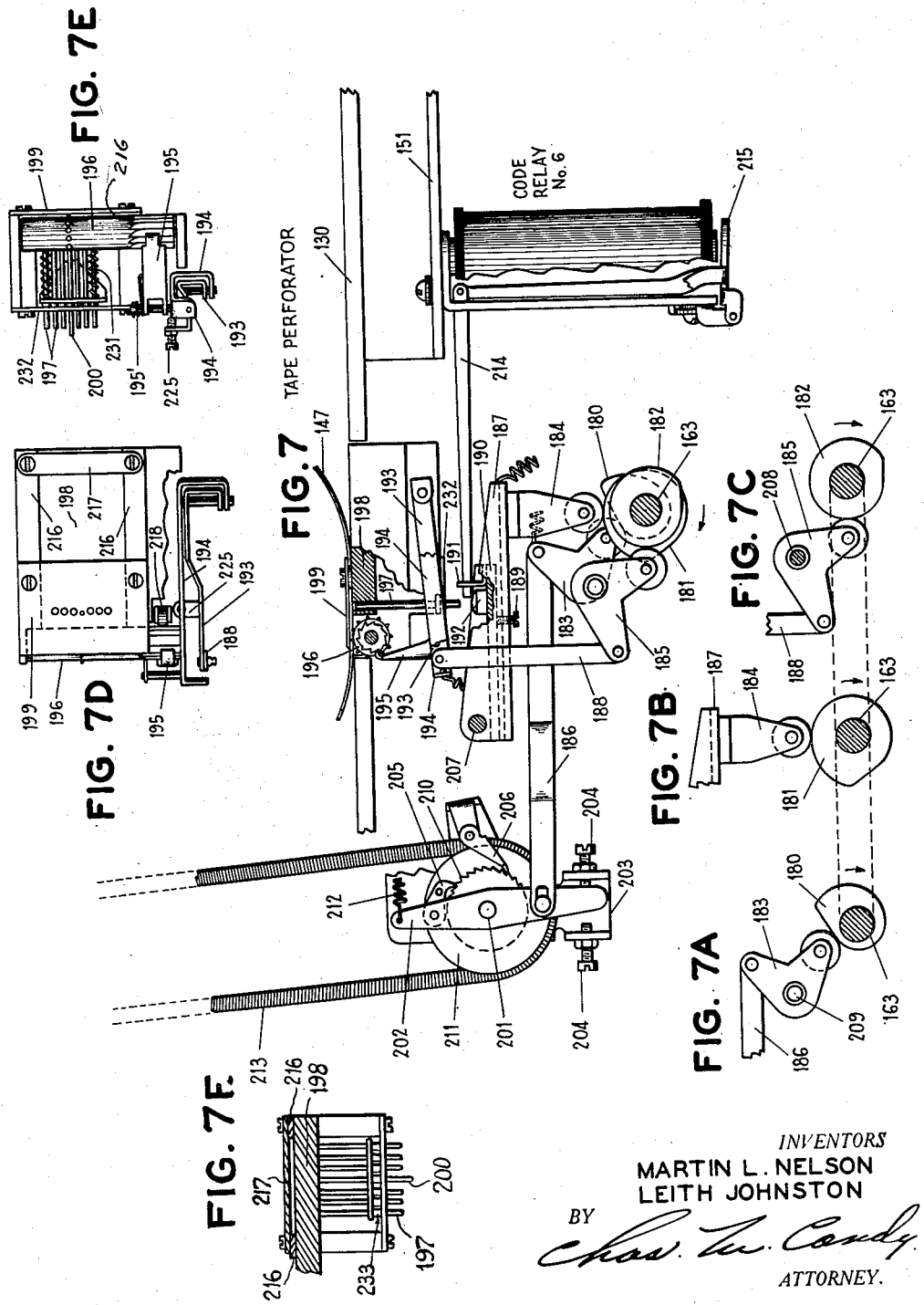

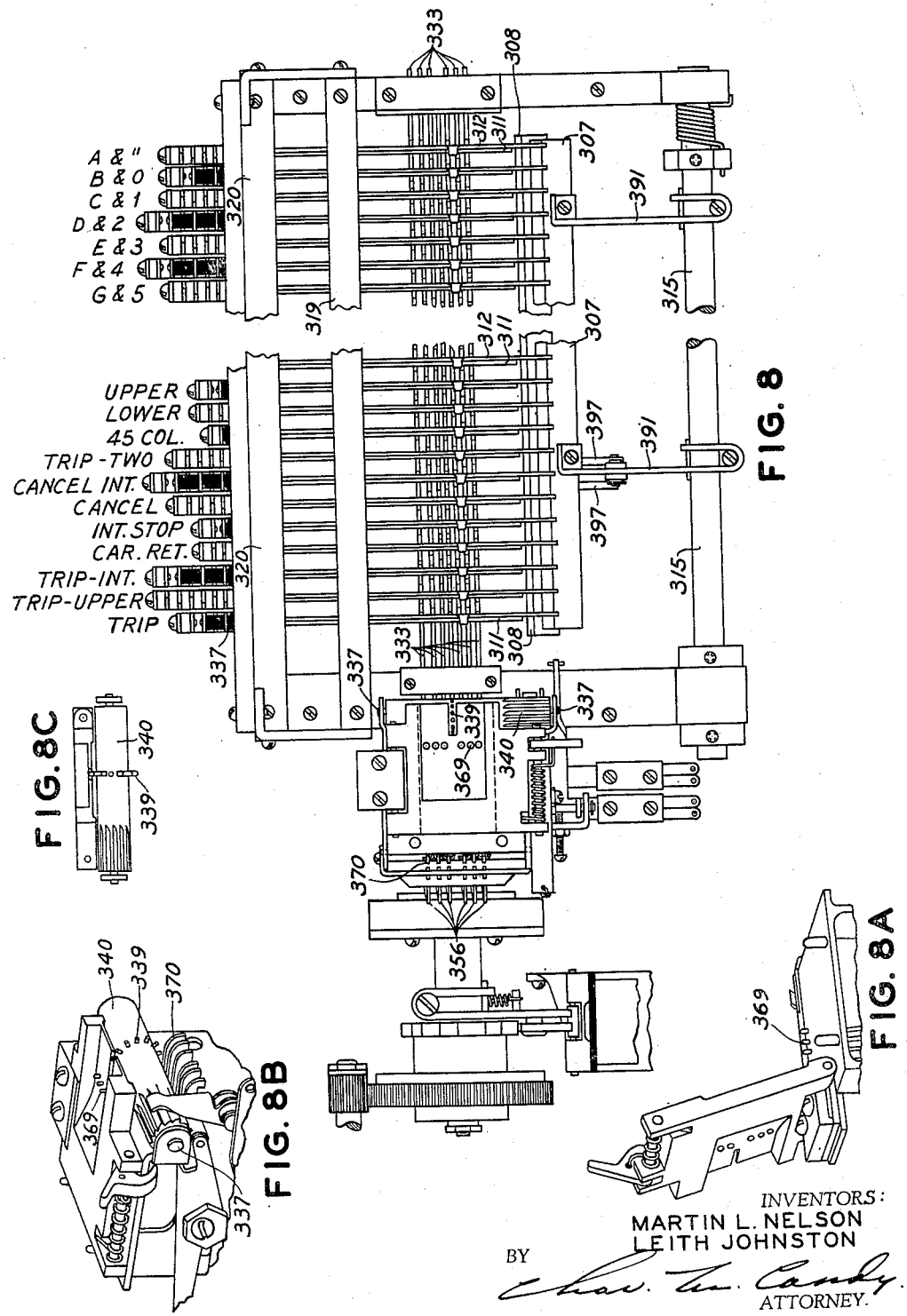

Dec. 19, 1939.　　M. L. NELSON ET AL　　2,183,820
RECORDING SYSTEM
Filed Nov. 16, 1935　　19 Sheets-Sheet 8
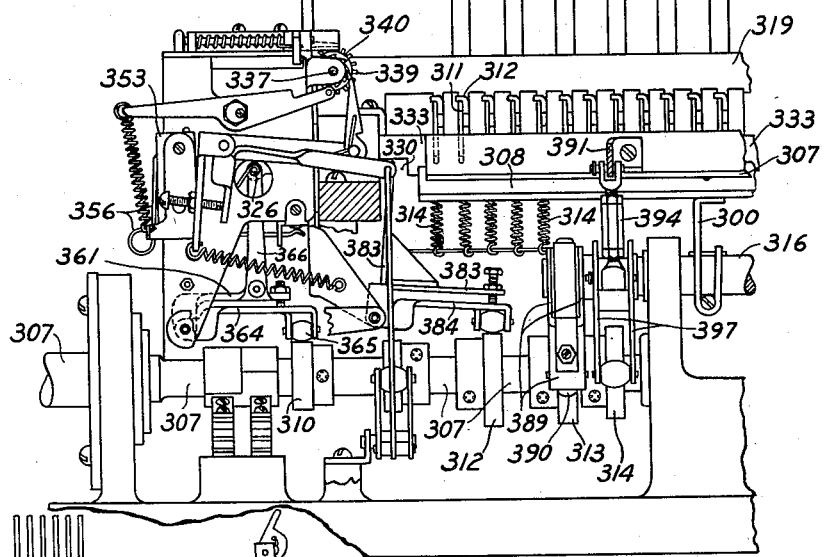
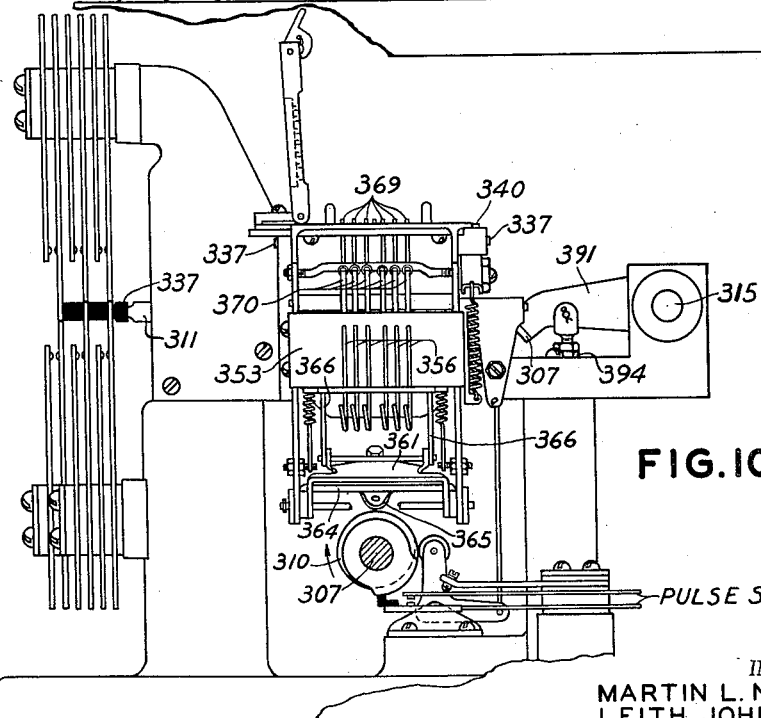
INVENTORS:
MARTIN L. NELSON
LEITH JOHNSTON
BY
ATTORNEY.

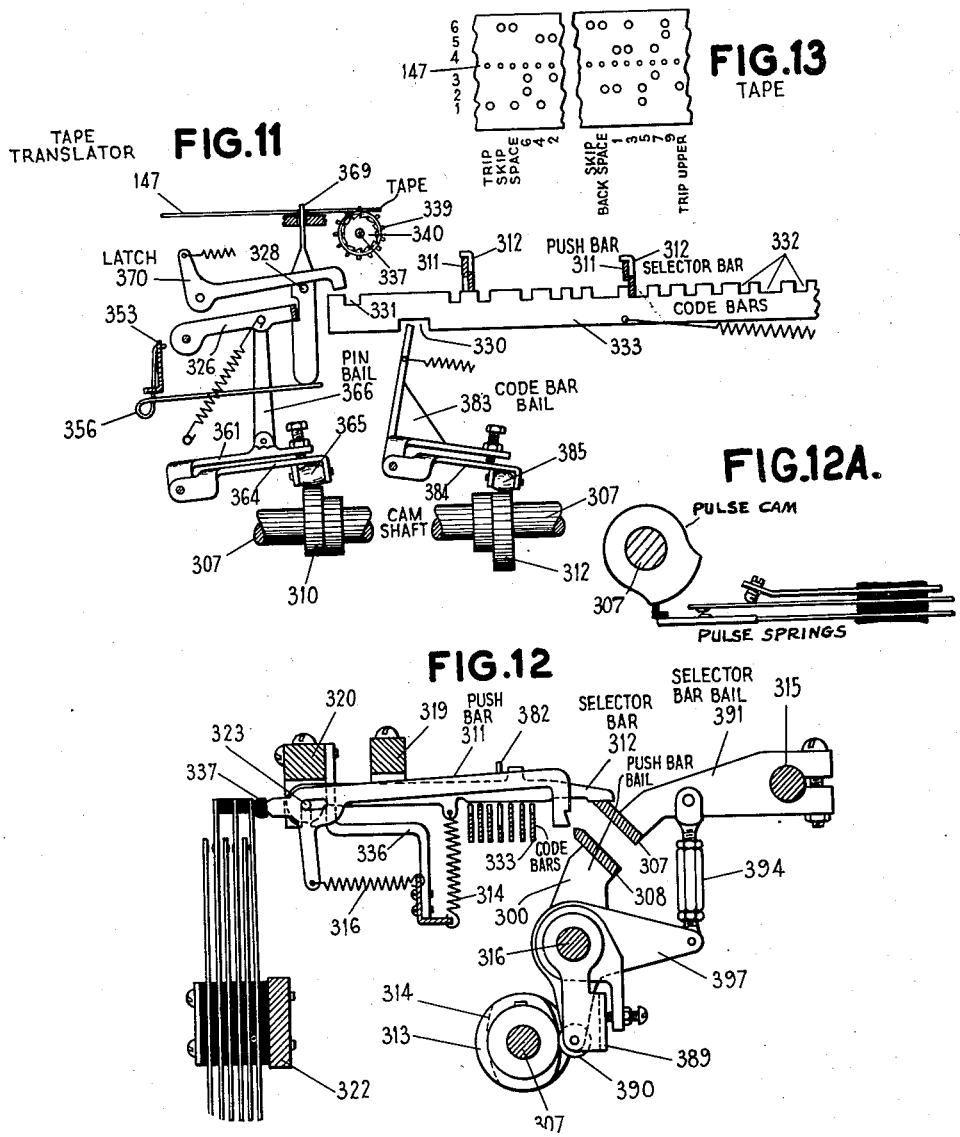

Dec. 19, 1939.                M. L. NELSON ET AL                2,183,820
                                RECORDING SYSTEM
                             Filed Nov. 16, 1935           19 Sheets-Sheet 10

FIG. 14
PUNCH

FIG. 14A

INVENTORS
MARTIN L. NELSON
LEITH JOHNSTON
BY
                              ATTORNEY.

Dec. 19, 1939.  M. L. NELSON ET AL  2,183,820
RECORDING SYSTEM
Filed Nov. 16, 1935  19 Sheets-Sheet 12
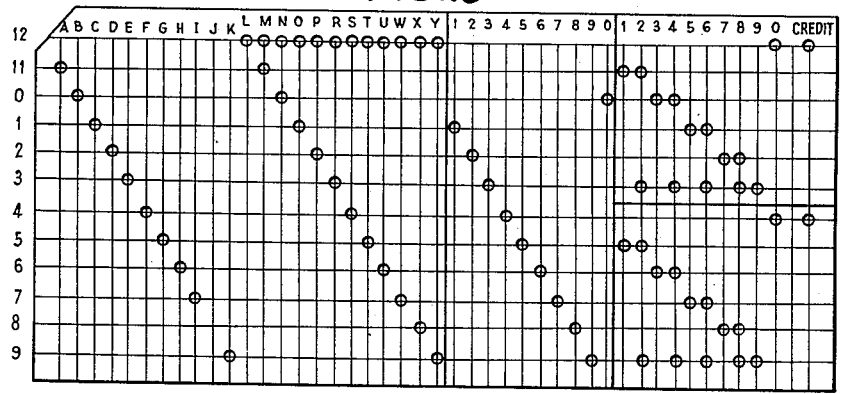
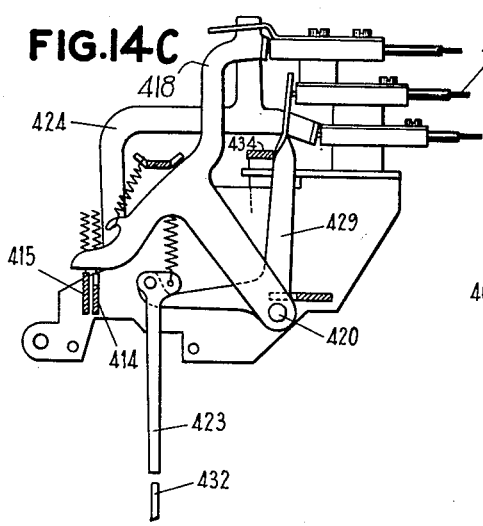
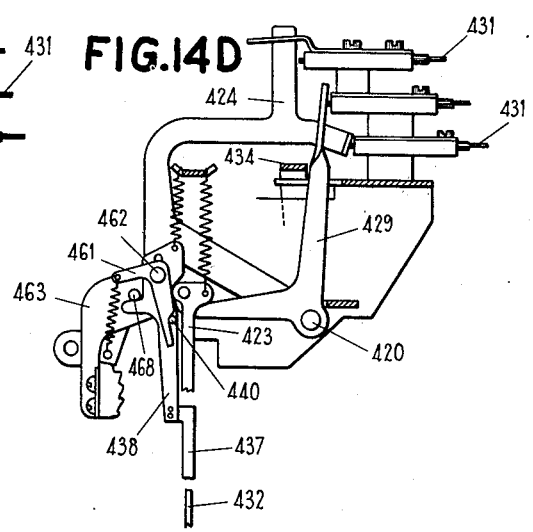
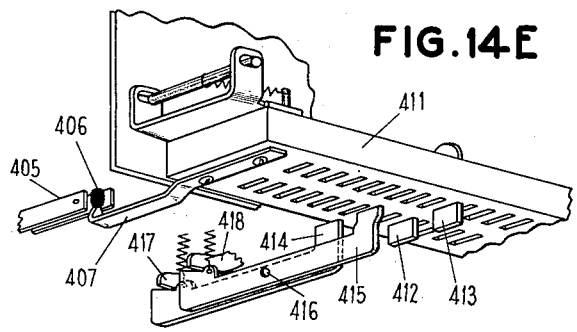
INVENTORS
MARTIN L. NELSON
LEITH JOHNSTON
BY
Chas. Fu. Candy.
ATTORNEY.

Dec. 19, 1939.　　　M. L. NELSON ET AL　　　2,183,820
RECORDING SYSTEM
Filed Nov. 16, 1935　　　19 Sheets-Sheet 13

INVENTORS:
MARTIN L. NELSON
BY　LEITH JOHNSTON

ATTORNEY.

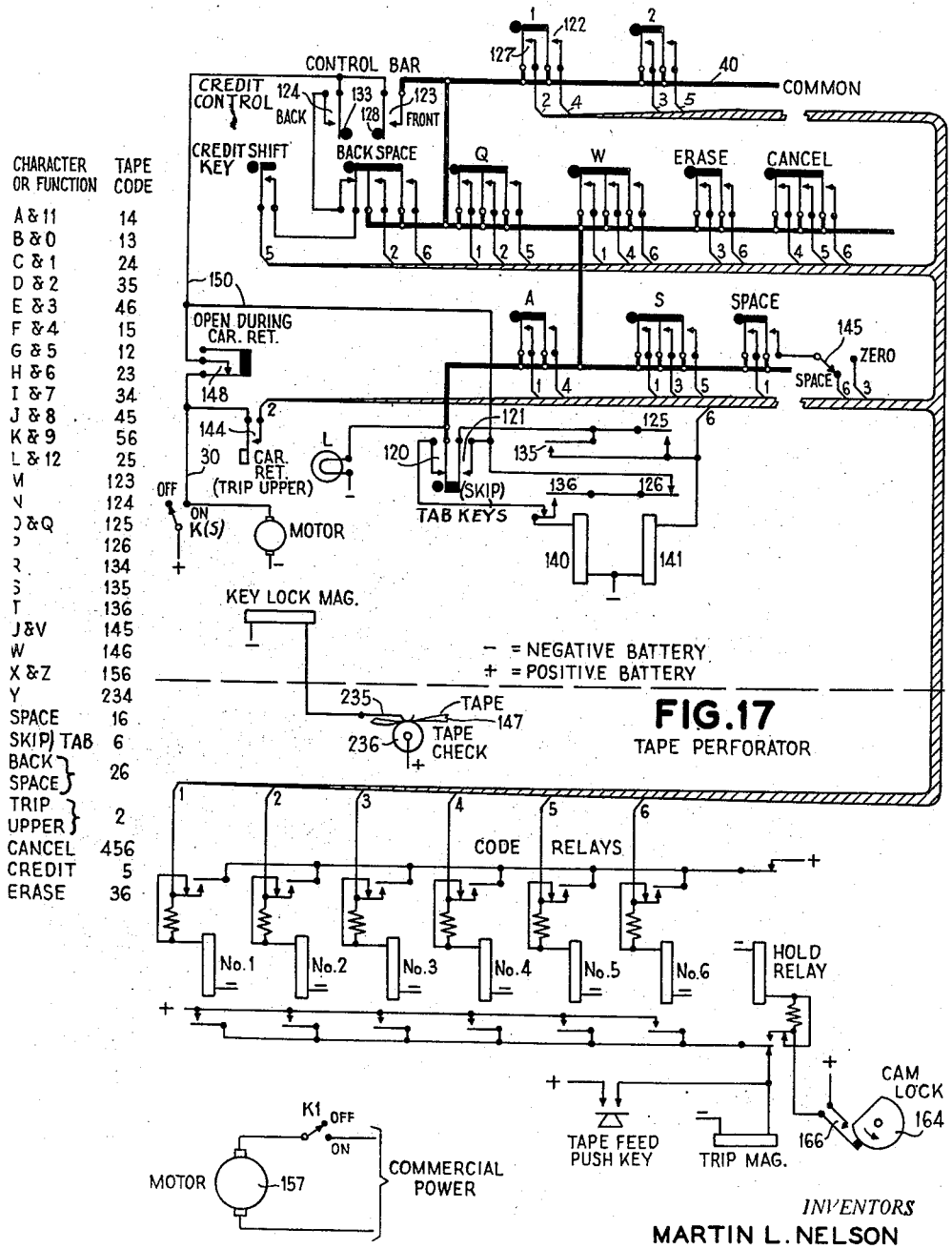

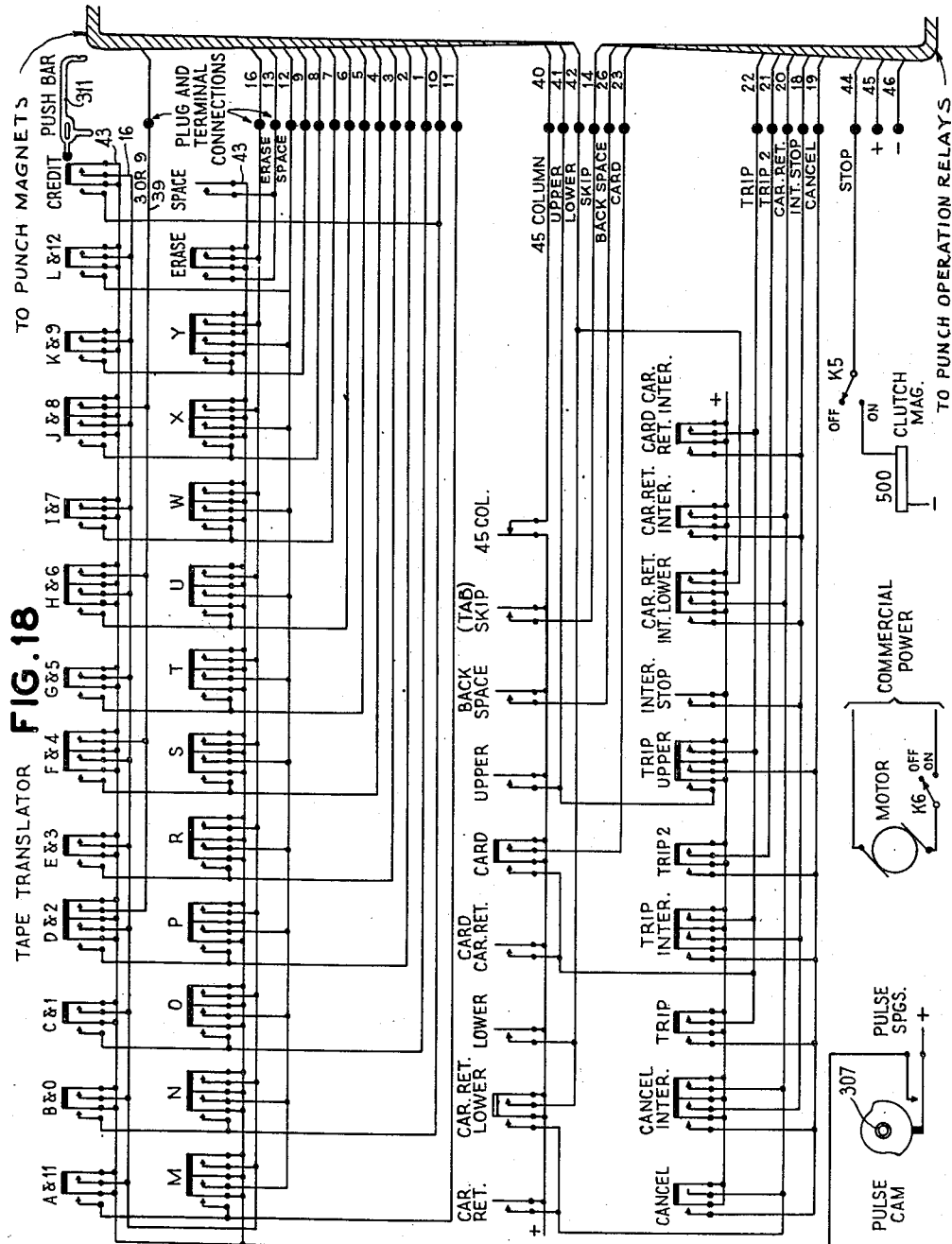

Dec. 19, 1939.  M. L. NELSON ET AL  2,183,820
RECORDING SYSTEM
Filed Nov. 16, 1935  19 Sheets-Sheet 16
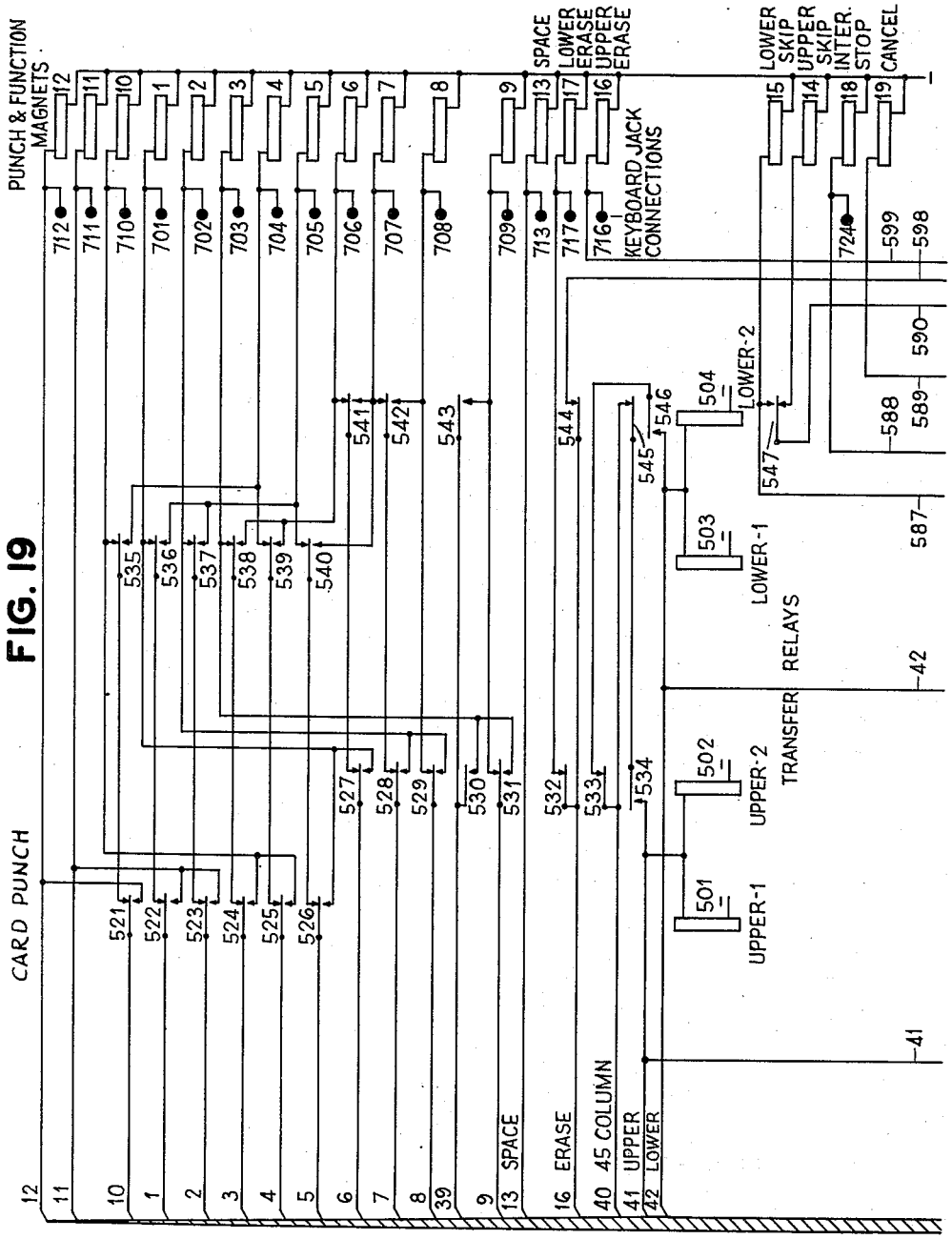
INVENTORS
MARTIN L. NELSON
LEITH JOHNSTON
BY
ATTORNEY.

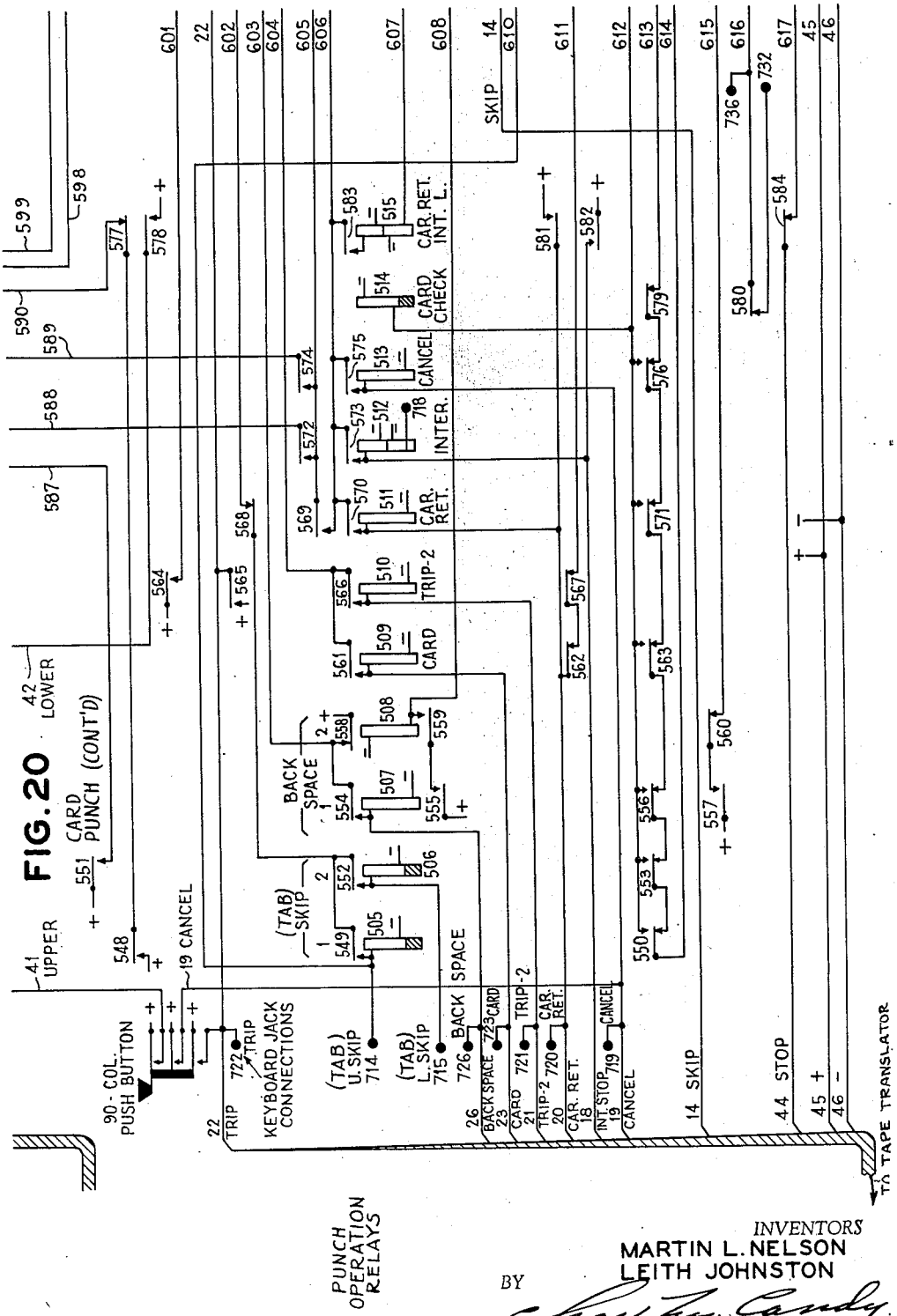

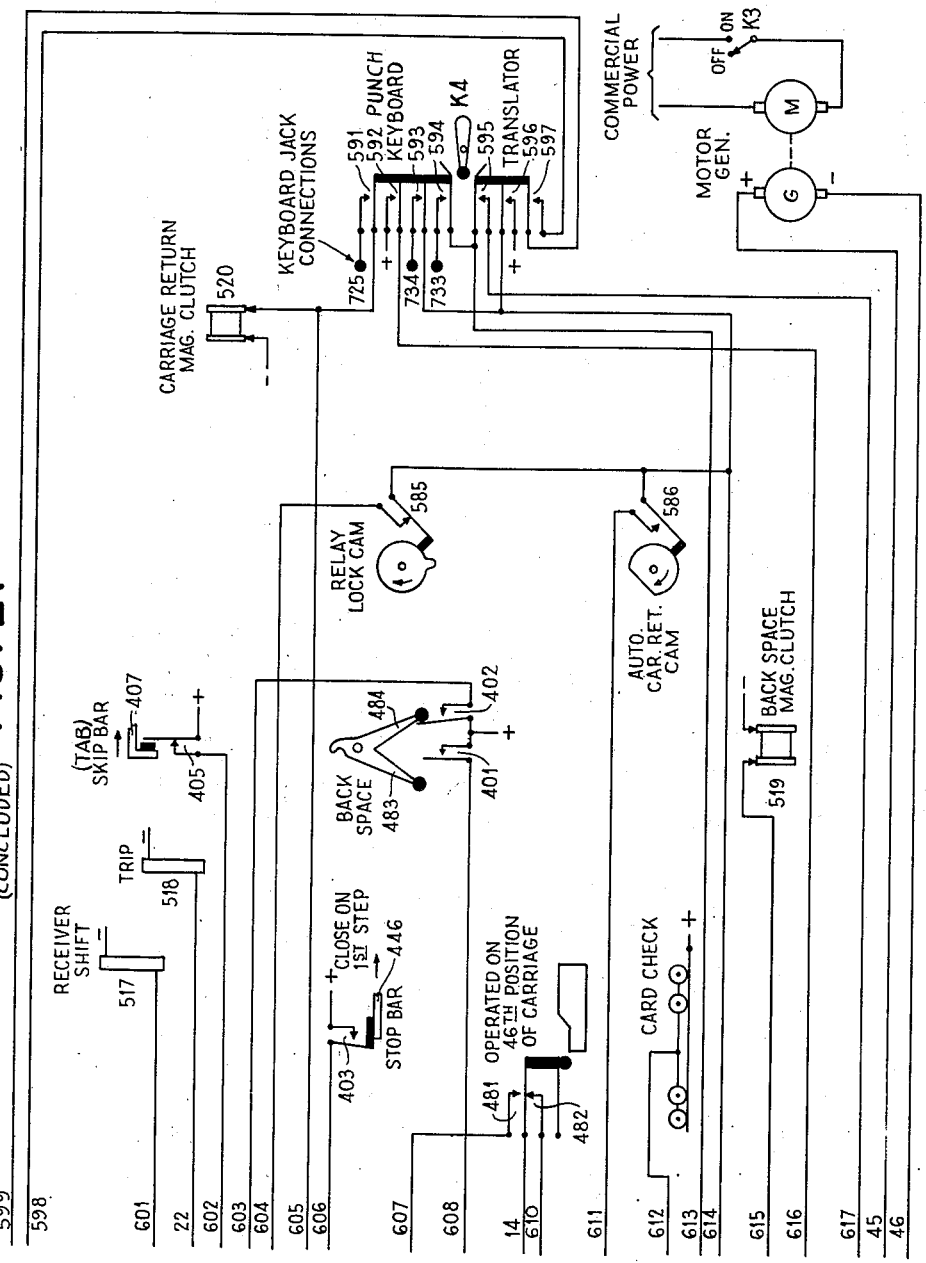

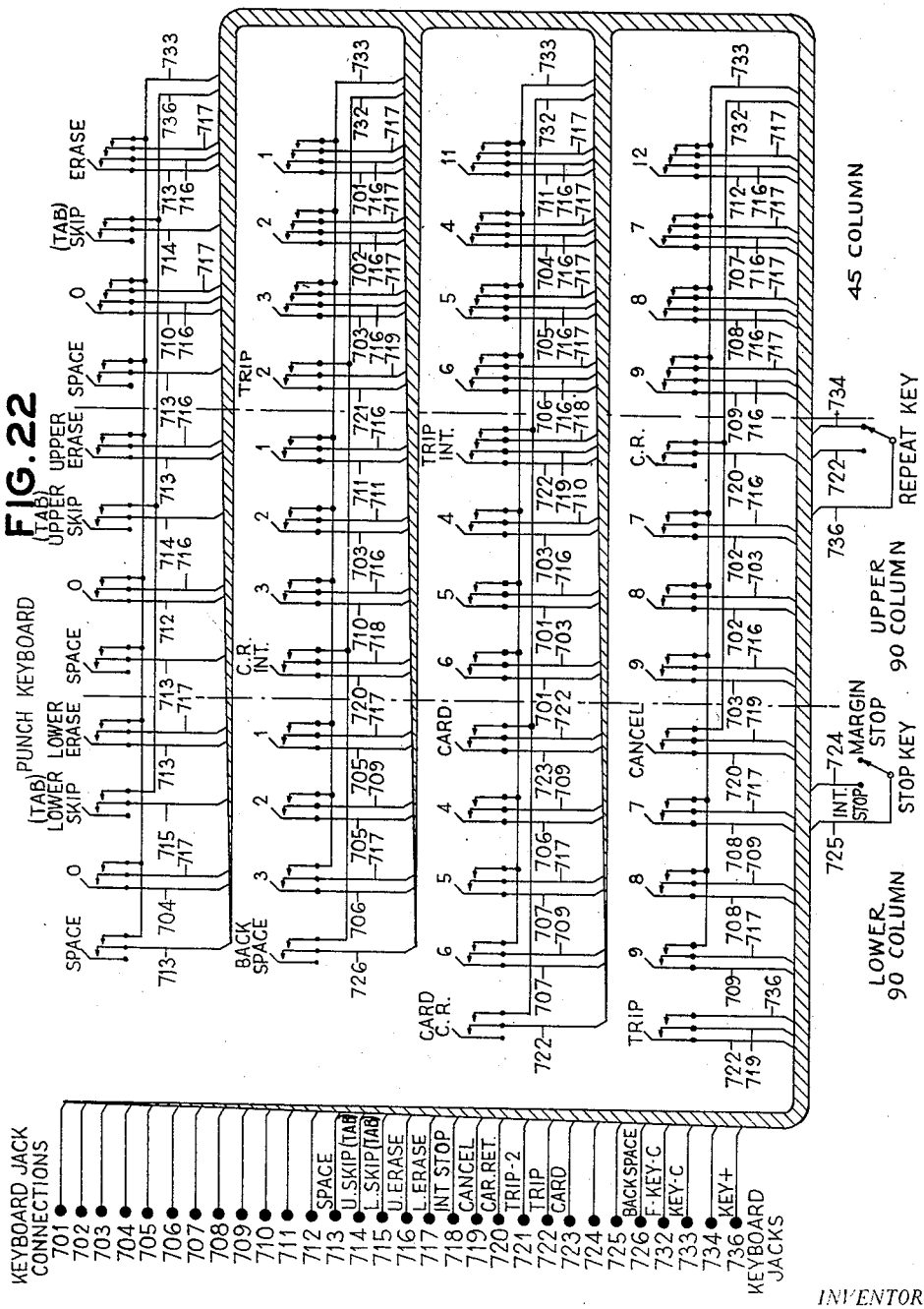

Patented Dec. 19, 1939

2,183,820

UNITED STATES PATENT OFFICE 2,183,820

RECORDING SYSTEM

Martin L. Nelson, Park Ridge, Ill., and Leith Johnston, Providence, R. I., assignors to Associated Electric Laboratories, Inc., Chicago, Ill., a corporation of Delaware Application November 16, 1935, Serial No. 50,140

22 Claims. (Cl. 164—113)

This invention relates in general to recording systems, but more particularly to a recording system for making two records of the same data, one of which is typed on a sheet and the other is punched in a record card which may be used to control tabulating machinery.

In the system disclosed in the present invention, bookkeeping typewriters type data entries on sheets and associated tape perforators perforate corresponding data in tapes which control a tape translator to operate a card punch to punch record cards in accordance with such data. In this system each typewriter is individually connected to a tape perforator and a tape translator is individually connected to a card punch. This arrangement enables a single card punch to take care of all the tapes perforated by a number of the combined typewriters and tape perforators and is therefore more economical than a system wherein the typewriter is directly connected to a card punch.

The main object of the invention is to provide an economical system of the above type for producing a typed record and a corresponding punched record by tape and by card.

Another object of the invention is the provision of an improved tape perforator and improved circuit arrangements in the bookkeeping typewriter machine for electrically and automatically controlling the tape perforator to punch a tape in code in accordance with the typed data.

A further object of the invention is the provision of an improved electrical control for a universal card punch which may be automatically controlled from a tape translator or manually controlled from its keyboard, in either case to punch a 45 or a 90 column card, or a combination 45 and 90 column card.

This type of system provides the following advantages: (1) That the punched tape may be allowed to accumulate for any desired period of time and then mailed to headquarters, which need be the only place where a tape-translator-and-card-punch combination exists; (2) The punched tape could obviously be sent by any well-known transmitter to a reperforator, as the well-known Hoover 1,851,838, by a short or long telegraph circuit of well-known kind, so that the tape punched at the substation could be telegraphically reproduced at headquarters for use in the tape translator-and-card-punch of this invention existing only at headquarters; (3) A further safeguard against fraud is obtained by having an added record, the punched tape, as a check against fraudulent change in the typewritten record or the final punched-card report, the punched tape being locked away in a safe by the head of the business.

One of the features relates to the provision of skip springs on the bookkeeping machine which are closed in response to the operation of either the palm skip tabulator or any decimal tabulator key to cause a skip perforation to be punched in the tape.

Another feature relates to the means whereby a credit perforation is automatically punched in the tape after a credit entry only in case both the control bar springs and the credit shift key of the bookkeeping machine are operated.

Another feature relates to the means for indicating to the operator when the bookkeeping machine and the tape perforator are jointly operable.

A further feature relates to the means for locking the numeral keys of the bookkeeping machine against operation in case the tape in the tape perforator breaks or is exhausted.

Another feature of the invention relates to a lock-pulse arrangement whereby only a single punching operation is performed by the tape perforator regardless of the length of time the initial actuating pulse is maintained.

Another feature relates to a tape having feed holes and a six-hole code with three code perforating spaces on each side of the feed hole; said tape having coded perforations so alined and positioned with respect to the feed holes that if the tape is incorrectly inserted in a tape translator such translator would be inoperative.

Another feature relative to improved circuit arrangements in the universal punch for automatically operating the punch carriage to its intermediate stop position in case a skip code is transmitted to the punch at a time when the carriage is resting in its 46th position.

Another feature relates to the circuits controlled by the transfer relay for converting a tape-controlled punch from 45 to 90 column working or vice versa.

A further feature relates to the means for making the punch controlling means inoperative to effect an operation of the punch at a time when the punch is performing a function operation.

Other features of the invention relate to improved circuit arrangements in this system which will be apparent from the following description of the drawings comprising Figs. 1 to 22 and subfigures, inclusive.

Fig. 2 illustrates the well-known Remington Electrified Bookkeeping Machine #85 manufactured by Remington Rand Inc. with an added base comprising spring contact assemblies for electrically controlling a tape perforator, an added key-lock magnet for locking the numerical keys, and other minor additions or alterations, all of which will be pointed out later.

Fig. 2A shows the key lock magnet for locking the numeral keys against operation.

Fig. 2C shows a new control bar for the bookkeeping machine provided with raised portions and recesses for controlling the control bar spring contacts and the credit spring contacts.

Fig. 3 shows a front view of the motor driven tape perforator with a portion of the side removed.

Fig. 4 shows a bottom view of the relay mounting plate and the operating mechanism mounted on the frame with the motor and its driving shaft omitted.

Fig. 5 shows in detail the trip magnet and clutch mechanism.

Fig. 6 shows in detail the adjustable holding detent and operating pawl for the tape feed star wheel.

Fig. 7 shows the various operating parts of the tape perforator unit and reeling mechanism in their relative locations to enable the operations, such as tape punching, feeding, and reeling operations, of the tape perforator to be clearly visualized.

Fig. 7 shows the reel winding cam and cam follower.

Fig. 7B shows the perforating cam and cam follower.

Fig. 7C shows the stepping cam and cam follower for operating the tape stepping pawl.

Fig. 7D shows a top view of the perforating assembly.

Fig. 7E shows an end view of the perforating assembly.

Fig. 7F shows a cross section of Fig. 7D.

Fig. 8 shows a top view of the tape translator with the driving motor omitted.

Fig. 8A shows a perspective view of the feeler pin guide cover in open position.

Fig. 8B shows a perspective view of the cover in closed position, the tape feed wheel, the operating pawl, and the adjustable detent.

Fig. 8C shows a front view of the tape feed wheel and guide cover.

Fig. 9 shows a partial side view of the tape translator with certain parts thereof removed to more clearly disclose the mechanism.

Fig. 10 shows a partial end view of the translator with the tape guide cover in an upright position.

Fig. 11 illustrates the manner in which the code bars of the tape translator are controlled.

Fig. 12 illustrates the manner in which the selector and push bars of the tape translator are controlled.

Fig. 12A shows the pulse cam and pulse springs of the tape translator.

Fig. 13 shows an enlarged section of the tape perforated by the tape perforator for controlling the tape translator, and shows the correct alinement and location of the coded perforations and feed perforations.

Fig. 14A shows a detail of the set basket of 90 column Powers card punch.

Fig. 14B shows a triple-numeric-keyboard for use on the 90 column Powers card punch.

Fig. 14C shows in detail one of the skip levers and one of the set-up levers on the carriage of the Powers punch.

Fig. 14D shows in detail the erase and one of the set-up levers on the carriage of the Powers punch.

Fig. 14E shows a portion of the settable skip (or tabulator) stops used in 90 column working of the Powers punch.

Fig. 15 shows a record card punched in accordance with the alphabet and in accordance with the numeral perforations for 45 and 90 column working.

Fig. 15A shows a 45 column record card punched with the alphabet and numeral perforations.

Fig. 15B shows a 90 column record card punched only in accordance with numeral perforations.

Figure 1:
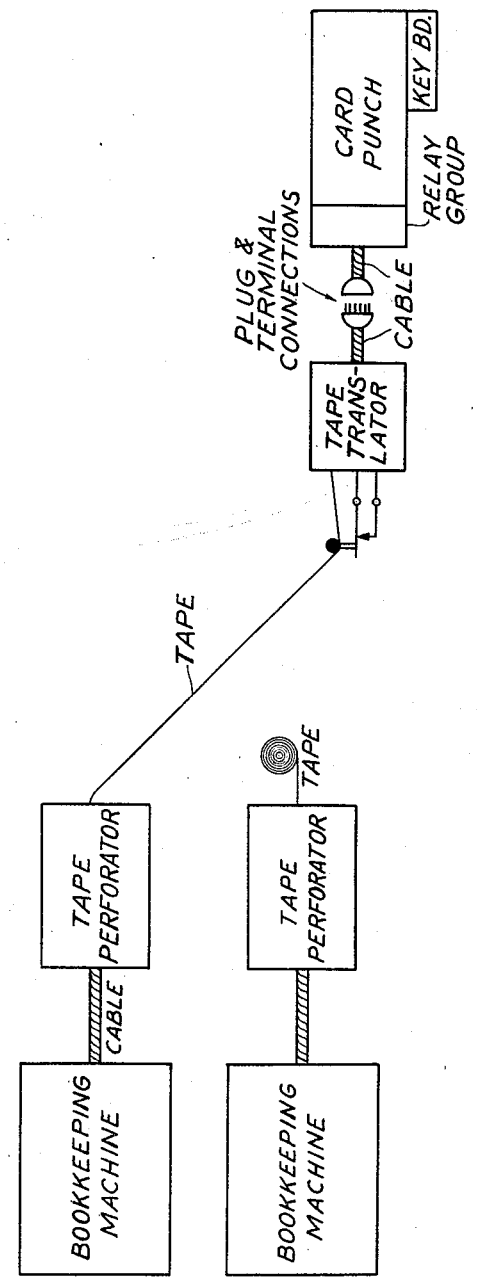
Fig. 1 shows a diagrammatic layout of the entire system.

Fig. 16 diagrammatically shows only a portion of the circuits controlled by the Remington bookkeeping machine.

Fig. 17 shows the complete circuits of the tape perforator.

Fig. 18 shows the circuits controlled by the tape translator.

Fig. 19 shows the transfer relays and magnets of the Powers recording punch.

Fig. 20 shows the circuits and relays for controlling the punch.

Fig. 21 shows further circuits of the punch.

Fig. 22 shows the so-called triple keyboard of the Powers punch.

BOOKKEEPING MACHINE

The Remington bookkeeping machine shown in Figs. 2, 2A, 2B and 2C, except for minor changes relating solely to the electrical control of circuits outgoing therefrom, is manufactured by Remington Rand Inc., and since this machine is well known and is used commercially as a bookkeeping machine, only a brief description of its mechanical construction and operation will be given.

The key action is merely initiated by the operator and is then automatically completed due to connection to a power shaft which is continually rotated by a motor. Each alphabet key 10 is pivoted in the usual manner near the rear of the machine and is held upwardly by a suitably located spring. Each alphabet key has a projection with a turned-over end for rocking a spring pressed bell crank 11 which supports a wipe-pawl at its upper end. A slight depression of the bell crank against its spring rocks the lower end of snatch-pawl 12 into position to be engaged by the continually rotating snatch roll 13. Pawl 12 is pivoted on a downwardly extending arm of actuating lever 14 so that the snatch roll 13 will carry the lever downwardly and rock bell crank 15 to actuate type bar 16. At about the time the type bar reaches printing position, the snatch roll 13 has carried pawl 12 down and to the rear into the path of a stud which automatically disconnects the pawl 12 and roll 13 thereby permitting the spring at the actuating lever 14 to return it to normal. Each pawl 12 in its downward movement actuates a corresponding interponent member 21 to operate a set of springs, or contacts corresponding to the character of the key actuated. These interponent members 21 have been added to the base for the purpose of actuating corresponding spring contacts.

The operation of the numeral keys 22 is slightly different and upon depression each numeral key lever enters the ball lock 23 to lock all other numeral keys against operation. The added key lock magnet, shown in Figs. 2A and 1A and 16, when operated inserts a lever 37, which is rotated with shaft 36 by the magnet armature, between the balls, in the same manner as a numeral key, to lock the keys against operation in a manner apparent from the disclosure in the Hart Patent 1,973,314. Loosely pivoted on each numeral key 22 is a spring urged pawl 24 whose lower turned-over edge lies slightly above a shoulder on a tripping bell crank 25. The bell crank 25 is rocked against spring tension as soon as the key enters the ball lock, and releases pawl 26 pivoted upon cam disc 27 to connect the pawl to the continually rotating shaft 28 through the clutch element rigidly mounted on shaft 28. On the periphery of each cam 27 is a roller mounted on arm 30 which is pressed downwardly to follow the contour of cam 27. Each cam 27 is provided with a slight depression in which the roller of arm 30 lies when the cam is disconnected from its clutch. The rear end of arm 30 carries a wipe-pawl 31 which snaps under the front end of rocker 33 when arm 30 is forced down. Rocker 33 is connected to a printing arm for actuating the bell crank 15 and type bar 16. Each cam 27 carries a pin which when out of normal position rocks hook 35 and shaft 36 to cause arm 37 to rock into the ball lock 23 and thus prevent depression of any key. The forward end of arm 30 forced pawl 24 to the right off of the ledge of bell crank 25 so as to prevent more than one rotation of cam 27 if the operator maintains the key actuated. Bell crank lever 25 returns to normal when pawl 24 is forced off the ledge of bell crank 25 in readiness to disengage pawl 26 from the clutch mechanism of the shaft 28. The rear end of arm 30 carries a roll 41 for rocking cam 42, which in turn operates a spring urged plunger 49 to actuate a set of springs, or contacts corresponding to the key actuated.

When one of the decimal tabulator keys 52 is depressed rod 53 is moved to the rear causing vertical lever 57 to rise due to the action of its roller on the cam surface of rod 53. The lifting of lever 57 causes the notch of member 58 to be interposed in the path of universal bail 60 and causes the universal bail 61 to be rocked. A projection on bail 61 lifts vertical lever 62 which rocks bell crank 63 out of engagement with pawl 64. Pawl 64, rotatably mounted on cam disc 65, now engages the associated clutch on the continually rotating shaft 66 to cause rotation of cam 65. The rotation of cam 65 causes the universal bail 60 and alined member 58 to move to the rear or left and rock lever 55 which in turn operates interponent 56 to the left to rock lever 54 to interpose the corresponding stop into the path of one of the tabulator stops. The operation of arm 54 throws the escapement wheel out of engagement with its rack through a well known series of links and levers, as may be readily seen in Fig. 2. An arm extending downwardly from the universal bar 60 to this bookkeeping machine to operate a set of skip springs 120 and 121 when the bar 60 is rotated to the left.

When the tabulator key is released, the roller of lever 57 allows the lever to drop releasing the rocking bail 61 thereby allowing lever 62 to be pulled down to rock the bell crank 63. The lower end of bell crank 63 is rocked into the path of pawl 64 to cause the disengagement of the clutch mechanism when the cam assembly rotates pawl 64 to strike bell crank 63.

Figure 2B:
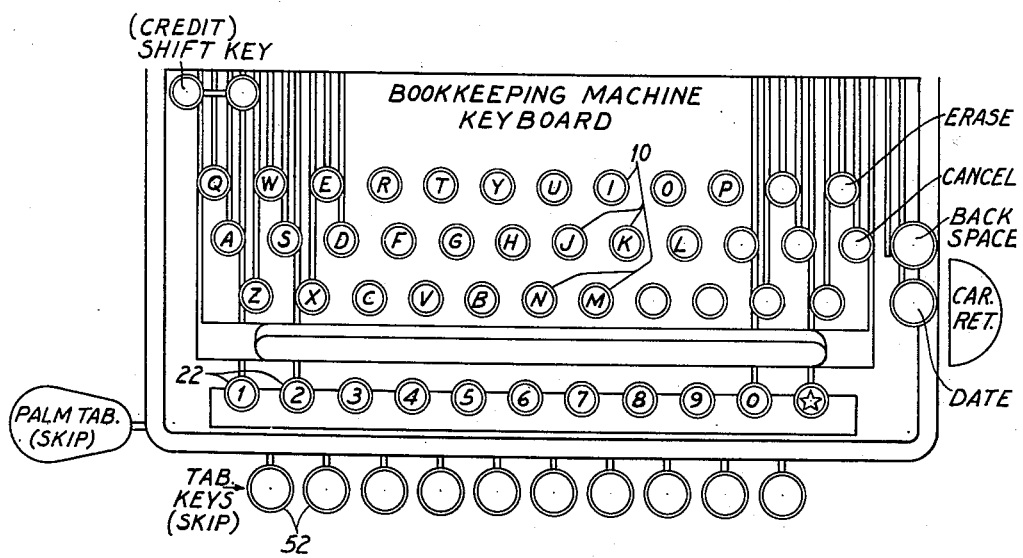
Fig. 2B shows a plan view of the keyboard of the bookkeeping machine.

The skip palm tabulator Fig. 2B is operated by the operator to operate the universal bail 60 Fig 2 and skip springs 120 and 121 and to cause the carriage of the machine to skip to the next typing position as determined by the present tabulation stops in a well known manner somewhat similar to the operation resulting from the operation of a decimal tabulator key. The operation of the skip palm tabulator Fig. 2B operates a bar 53 Fig. 2, lever 57, member 58, lever 63, bail 60, clutch 64, cam 65, lever 55, interponent 56, and arm 54 as previously described. The carriage is now moved until this arm 54 engages one of certain prearranged tabulator stops. The skip springs 120 and 121 Fig. 2 and Fig. 16 are therefore operated in the same manner regardless of whether a decimal tabulator key or the skip palm tabulator is operated.

The operation of the back space key trips a pawl into the clutch on the continually rotating shaft 66 to cause the carriage to be back-spaced one position and also operates a set of backspace springs individual thereto. The shift key also operates a set of springs individual thereto as well as controlling the shift operation in the well known manner. The erase and cancel keys in a similar manner operate spring contact assemblies. The other control keys seen in Fig. 2B also similarly operate contact springs.

The carriage of this machine as added to effect the controls of the instant case, carries a control bar 134 having raised portions and recesses therein for operating the associated control bar springs to complete circuits when keys are operated in certain positions of the carriage for controlling the operation of a tape perforator in very much the same manner as is disclosed in Patent #1,790,479, issued January 27, 1931 to W. W. Lasker for controlling a card punch.

The control bar 134 is shown in Fig. 2C and is provided with projections 137 which by means of insulated roller 128 close springs 123 in certain positions of the carriage. Springs 123 are therefore closed only in certain carriage positions when it is desired to operate the tape perforator. The small recesses 138 correspond to the decimal and line or column points on the sheet in which positions the operator operates the space key while springs 123 are open so as not to perforate a space perforation in the tape. The larger recesses 138 correspond to typing positions on the sheet which allow springs 123 to open so that the corresponding data will not be perforated on the tape. The small projections 139 on the control bar are for closing springs 124 to control the tape perforator to punch a credit indication or code in case the credit shift key of the machine is operated at the time the entry in this particular column is made, as will be more fully described hereinafter.

The mechanical construction of the Remington bookkeeping machine is the same as shown in Figs. 1, 2, and 5 to 35, inclusive, of the Lasker Patent 2,059,253 with certain exceptions, hereinafter, pointed out. A new sub-base comprising numeral key spring contacts, alphabet key spring contacts, credit shift key spring contacts, back space key spring contacts, erase key spring contacts, cancel key spring contacts, carriage return spring contacts, space spring contacts, (skip) tabulator spring contacts, a pair of spring contacts which are open only during the return of the carriage, a pair of relays (140 and 141, Fig. 16), a lamp (L—Fig. 16, the key lock magnet, and a pair of manual throw switch keys, one of which is the start key (K(s)—Fig. 16) has been added in place of the perforating mechanism shown in the sub-base of the Lasker Patent 2,059,253. It should also be pointed out that certain of the keys of the bookkeeping machine do not control or operate any spring contact assemblies, because the operation of these certain keys should not in any way control the associate tape perforator.

In addition, an arm extending downwardly from the universal bar 60 has been added for the purpose of operating the skip (tab) spring contacts, shown in Figs. 2 and 16. Further, the control bar 134, shown in Figs. 2 and 2C, has been substituted for the bar 33, shown in Fig. 33, of said Lasker patent, and the control bar springs operated by bar 134 have been added.

The bookkeeping machine, due to the circuit connections controlled by the control bar, does not cause the tape to be perforated with alphabetical codes when the alphabet keys are operated, because, in the instant invention, it is desired that the tape perforator, the tape translator and card punch should record only numeral characters and not alphabetical characters. Although the spring contact assemblies, corresponding to the actuated alphabetical keys, are closed in response to such key operations, no circuits are completed, in the instant application, for operating the punch controlling magnets of the tape perforator because the positive battery feed circuit to these magnets is opened by the control bar springs 123. A different control bar will be fastened to the bookkeeping machine whenever it is desired to have the alphabetical characters recorded in the tape. This different control bar would, therefore, render the actuation of the alphabet spring contact assemblies effective to control the punching magnets of the code perforator by closing control bar spring contacts 123 in typing positions when the alphabetical keys are actuated.

In addition, since only a small number of function operations of the card punch need to be controlled from the bookkeeping machine, the bookkeeping machine is, therefore, only provided with the function controls listed at the left in Fig. 16. However, if additional function controls should be needed at any time, the same could easily be provided by the addition of a spring contact assembly for the corresponding added function key.

TAPE PERFORATOR

Referring now in detail to the tape perforator shown in Figs. 3 to 7, inclusive, Figs. 7A to 7F, inclusive. The operating parts are enclosed in a box shaped casting 129 which also acts as the base. A mounting plate 130, which forms the top for the box-like casting 129, is provided for mounting the operating mechanism of the tape perforator. A mounting casting 154 (Figs. 3 and 4) is secured to the bottom of mounting plate 130 by means of machine screws 155 at three separate projections formed in this casting. A shoulder is formed on the right side of casting 154 for mounting the relay mounting plate 151. Holes are also provided in the mounting casting 154 for mounting the shaft assembly while other projections and shoulders are provided for mounting the cam followers, clutch mechanism, and perforating assembly. The motor 157 is mounted on a plate 156 which is secured to mounting plate 130, by means of screws 158 and washers 159. The reel housing casting 142 is mounted on plate 130 and is provided with shafts for mounting the tape reels 143 in the manner shown in Fig. 3. A tape wire guide 146 is mounted on the right of the housing 142 to guide the tape when the same moves from right to left. Tape check springs 235 and lug 236 mounted on an insulating block are provided to lock the typewriter numerical keys by operating the key lock magnet (Figs. 2A and 16) when spring 235 engages the lug 236 in case the tape is exhausted. The cam shaft 163 is provided with a cam 164 for operating the springs 166, a clutch stop arm 167 for rotating the shaft, and cams 180, 181, and 182 (Figs. 7, 7A, 7B, and 7C) for controlling the reel winding of the perforating and stepping mechanisms. The shaft 163 is rotatably mounted in roller bearings in mounting casting 154. The gear 162 and clutch gear 168 are loosely mounted on shaft 163 so as to freely rotate thereon. The motor 157 by means of motor shaft 160 and gear 161 drives the gear 162 and clutch gear 168 without operating the shaft 163 until such time as the trip magnet is operated to cause the catch 169 to engage the teeth of gear 168, whereupon the shaft 163 rotates with the gears 162 and 168. Springs 166 operated by cam 164 are mounted on bracket arm 165 secured to the relay mounting plate 151. The cam followers 183, 184, and 185 (Figs. 7A, 7B, and 7C) each comprise two parallel side plates with a roller therebetween which constantly engages its associated cam. Cam follower 183 is pivoted at 209 on the casting 154. When the roller of the cam follower 183 engages the high spot of cam 180 the arm 186, due to the rotation of cam follower 183, is operated to the left, and while in engagement with the low spots on cam 180 the arm 186 is operated to the right. The operation of arm 186 to the left and right causes the arm 202 (Fig. 7) to engage alternate adjusting screws 204 and causes pawl 205 to engage the teeth on gear 210 to operate pulley 211 and belt 213. Pawl 206 is a holding pawl for holding gear 210 in its advanced positions. The pulley 211 and gear 210 are rotatably mounted on a shaft 201 in arm 203 (Fig. 4) which is fastened to the mounting casting 154. Cam follower 184 follows the high and low spots on cam 181 to reciprocate plate 187 which is pivotally mounted at its turned up edges at 207 (Fig. 7). A small but similar plate 190 is pivotally mounted inside of the plate 187 at 207 and has a bar, or anvil 192, upon which the relay code bars 214 rest when the corresponding relays are actuated. Also fastened to plate 190 is a combed bracket 191 which acts as a guide for the code bars 214. An adjusting screw 189 extending through plate 187 into plate 190 is provided to adjust the two plates 187 and 190 with respect to each other and also to adjust the perforating stroke. Cam follower 185 also follows the high and low spots on cam 182 to raise and lower arm 188 and arms 193 and 194 to in turn raise and lower pawl 195 to advance the tape feed star wheel 196. Arms 193 and 194 are pivotally mounted at their right as shown in Figs. 7 and 7D. An adjusting screw 225 (Fig. 7E) is threaded in the bent-over ear of arm 193 to provide an adjustment for the stroke of the arm 194 upon which is pivotally mounted the stepping pawl 195. Pawl 195 is held in engagement with the teeth on start wheel 196 by means of the spring 195'. Figs. 7D and 7E show the perforating mechanism and block which is fastened to the mounting casting 154. Six perforating pins 197 extend through the lower guide plate 232 and have lugs 233 (Fig. 7F) which normally rest on the upper face of plate 232. Pins 197 are actuated whenever their corresponding code bars 214 are in operated position directly underneath the corresponding pins at a time when the perforating plate 190 is operated. Springs 231 (Figs. 7E) normally hold the perforating pins in the position shown, or just below the top of guide block 198, as shown in Fig. 7. The middle perforating pin 200 is operated each time the plate 190 is raised and this pin punches a small hole each time to provide the feed holes by means of which the lugs on the tape feed star wheel 196 steps the tape. Pins 197 punch larger holes, the relative size and position being shown in the top guide plate 199 (Fig. 7D). Bars 216 and 217 fastened to the block 198 guide the tape to punching position. One of the features of this tape perforator relates to the positions in which the code and feed perforations are punched in the tape. The outside perforations are located at unequal distances from the edge of the tape, as shown in Fig. 13, and the front edges of both the code and feed perforations are in alinement. That is, the centers of the code perforations are not in alinement with the center of the feed perforations. The tape is perforated in this manner so that when the same is put in a tape translator such translator will not operate if the tape is put in wrong.

The trip magnet, hold relay, and the six code relays are mounted on the relay mounting plate 151. The armature 175 of the trip magnet controls an arm 174 to operate the clutch mechanism, the armature of the hold relay controls springs and the armatures 215 of the code relays each operates a code bar 214 and sets of springs.

The clutch mechanism is shown in detail in Fig. 5. A J-shaped arm 167 is keyed and secured to shaft 163 and the clutch catch 169 is pivotally mounted on arm 167. A spring 170 is tensioned to raise catch 169 to rotate on its pivot to engage the teeth of gear 168 when the trip magnet operates to remove the stop block 176. The arm 167 and catch 169 then rotate with gear 168 to cause the shaft 163 to rotate therewith, it being previously explained that gear 168 rotates freely on the shaft 163. The operation of armature 175 operates arm 174 to the left which rotates lever 171 on its pivot 226 to remove the stop block 176 from under the tail of the catch 169, whereupon the spring 170 causes the catch 169 to engage with one of the teeth of gear 168 and rotate the shaft 163. When the trip magnet deenergizes, spring 172 fastened to lever 172 restores the lever 171 and stop block 176 in the path of arm 167 and catch 169. When the ear of catch 169 and arm 167 strike the stop block 176 the catch 169 disengages from the teeth of gear 168 to stop further rotation of shaft 163. The stop block 176 is fastened to an arm 177 which is slidably mounted on lever 171 by pin 229 and slot 228, while the upper portion of arm 177 slides between lever 172 and pin 227. The blow struck by the arm 167 and catch 169 causes the block 176 and arm 177 to move downward a short distance and block 176 is immediately returned by spring 178 which also deadens the blow. Lever 172 is rotated on its pivot 226 so that its lower edge is above the arm 167 to prevent rebound or rotation of shaft 163 in the reverse direction.

Fig. 6 shows the detail holding mechanism and adjustments for adjusting the star wheel 196. A roller 218 is rotatably mounted in arms 219 which are pivoted at 220. Spring 224 causes the roller 218 to be pressed into one of the grooves in wheel 196 so as to hold the star wheel 196 in proper position. Arm 223 is pivoted at 230 and is adjusted to proper position by adjusting screws 221 and 222. Screw 221 is threaded in block 198 and engages the arm 223 to the right of pivot 230 so as to lower or raise the roller 218 to proper position so that the lugs on the star wheel 196 are in proper position. When screw 221 is properly set screw 222, which loosely extends through block 198 and screws into arm 223, is tightened to hold cam 223 in its set position.

Referring now to Fig. 7 a brief description of the mechanical operations of the tape perforations will be given. The energization of one or more code relays operate their associated code bars 214 to the left between the punch pins 197 and anvil 192. The trip magnet (Fig. 5) is now operated by the operated code relays to release catch 169 thereby causing shaft 168 to rotate with gear 163 driven by motor 157. Cam 181, in the first quarter revolution of cam shaft 163, operates punching plates 187 and 190 to cause only the pins 197, which have their associated code bars 214 in punching position, to perforate the tape. Punch feed pin 200 is operated each time plate 190 is operated to perforate the tape feed holes. When cam 181 is lowering pins 197 on the next quarter revolution of shaft 163, the cam 182 is raising pawl 195 by means of arms 188, 193 and 194 to engage the next tooth of the star wheel 196. After the cam follower 185 rides over the raised portion of cam 182, the pawl 195 is lowered to rotate star wheel 196 which, by means of its lugs and feed perforations, advances the tape one step to its next perforating position. On the remainder of the revolution cam 180 operates ratchet wheel 210 and pulley 211 as previously described to operate the left reel 143 to wind up the perforated tape. Cam 164 (Figs. 3 and 17) closes springs 166 shortly after the energization of the trip magnet to operate the hold relay which in turn releases the trip magnet so as to stop the shaft 163 when the catch 169 and arm 167 engage the stop block 176 as previously described. The above description explains one complete operation of the cam shaft 163 and one perforating operation. Succeeding operations are similar to the above except that different code relays are operated for different characters or functions to perforate the tape with coded perforations corresponding to such characters and functions. The tape perforator in addition to the above has a push button (diagrammatically shown in Fig. 17) mounted on the mounting plate for operating the trip magnet in response to each operation of the push button. The operation of the push button alone operates the trip magnet which causes the tape to be perforated with only a feed perforation, in case the motor is operating at this time, and thereafter advances one step, or, if the push button is held down for a time, a section of tape is perforated with only feed holes, such section being dependent upon the speed of the perforator and the length of time the push button is held operated.

TAPE TRANSLATOR

The tape translator shown by sectional elevations and plan views in Figs. 8, 8A, 8B, 8C, 9, 10, 11, 12 and 12A is mechanically the same in construction and mechanical operation as the tape translator shown and described in Figs. 1, 2, 3, 4, 5, 6, 7 and 8 of the Nelson et al. Patent 2,087,674, issued July 20, 1937. The spring contact assemblies operated by the push bars and the circuits controlled by these spring contact assemblies, being, however, different from the spring contact assemblies and circuits shown in Patent 2,087,674. The capacity of the instant tape translator has been slightly increased by adding a few selector bars and their associated push bars and spring contact assemblies. Since the mechanical construction and mechanical operation of the tape translator is similar to the tape translator in Patent 2,087,674, only a brief description of the operations performed by the tape translator will now be given, as Patent 2,087,674 may be referred to for the detail mechanical construction and operation.

The cam shaft 307 of the tape translator is rotated by means of a small motor and a mechanically controlled clutch (not here shown). The tape translator mechanism is controlled by cams 310, 312, 313, and 314 on the cam shaft 307 and by the perforated tape. The lugs 339 on star wheel 340 feed the tape one step with each cycle of operation of the cam shaft 307 and position the tape in its rest positions so that the perforations in the tape are directly over the feeler pins 369. The detent for aligning the lugs 339 of the star wheel 340 is adjustably mounted, as shown in Figs. 8B and 9, so that the lugs 339 may be rotated to move the character code perforations in the tape directly above the feeler pins 369 in case the tape 147 is correctly inserted in the translator. The rotary adjustment of the lugs 339 of the star wheel 340 with respect to the punchings in the tape is such that, if the tape is inserted wrong, that is reversed longitudinally end-for-end, the character perforations will not line up directly over the feeler pins 369 with the result that the pins do not operate, even though a small portion of the perforations are above the pins. This provision is made because the tape has three perforating spaces on either side of the feed holes, and therefore, it is very easy to insert the tape wrongly, especially if a short piece of tape is to be translated. The marginal differences from the two edges of the tape to the nearest perforating space, easily identify top and bottom of the tape. The feeler pins 369 have individual springs 356 to force them against the tape 147, but they are held from doing so by the pin bail 326—366 which has stronger spring tension. The pin bail 326—366 is moved by a cam 310 on cam shaft 307 which raises pin bail 326—366 and allows the feeler pins 369 to press against the tape or to pass through perforations therein. Associated with each feeler pin 369 is a code bar latch 370 which is moved by the lug 328 on the feeler pin in case such pin extends through a perforation in the tape. There are six permutation code bars 333, one for each code bar latch 370. The code bars 333 are normally held in position behind the latches 370 by the cam operated code bar bail 383. When the feeler pins 369 have moved their full distance, the code bar bail 383 is moved by cam 312 so as to permit movement of the code bars 333. The code bars 333 are either held by their individual latches 370 or move a definite distance dependent upon the position of their individual latches, which, in turn, are controlled by the associated feeler pins and perforations in the tape.

The code bars 333 have notches 332 cut in them so that for each given code certain notches in all the code bars will be in alinement. Directly above these notches 332 are selector bars 312 and push bars 311, the downward movement of the latter being controlled by the turned over ears, or edges, of their associated selector bars. The selector bars 312 are normally held off the code bars 333 by the cam operated selector bar bail 307, but as soon as the code bars 333 are moved by their individual springs, the selector bar bail 307 allows all the selector bars 312 to fall against the code bars 333. Assuming that a particular code has been selected by the feeler pins 369 and that certain of the code bars 333 have been moved, the code bars will have one series of notches 332 in alinement and the selector bar 312 above these alined notches will drop therein and carry its associated push bar 311 with it. The cam 313 operates the push bar bail 308 to engage the notch in only the push bar 311 that has dropped with the selected selector bar 312. The push bar bail 308, due to the co-operation of cam 313 and cam follower 389, pushes the selected push bar 311 to close the associated spring contacts located at its opposite end. As soon as the push bar bail 308 engages the selected push bar 311, the same is held in engagement therewith and the selector bar bail 307 may now restore the selector bars 312 when cam 313 and cam follower 397 raises the arm 391 and bail 307. The code bar bail 383 is now restored by cam 312 to restore the code bars 333 in order to make a new selection while the selected push bar 311 is being held and operated by the push bar bail 308. As soon as the code bars 333 have moved to their selecting positions, the feeler pins 369 are restored to normal by feeler pin bail 326—366 and cam 310, and the tape feed pawl is operated by a cam (not shown) to rotate the star wheel 340 and position the tape for the next selection. The stop or rest position of the tape translator is at a time when the feeler pins 369 are being lowered from sensing the tape and the code bars 333 have been operated to their selecting, or operated, positions in readiness to cause the operation of the corresponding push bar for this selection on the next operation of the cam shaft. The selector bars 312 have started to come down against the code bars 333. The previously operated push bar 311 has been released to open its associated springs and the push bar bail 308 is in normal or unoperated position while the pulse springs (Fig. 12A) on the cam shaft 307 are open as shown diagrammatically in Fig. 18.

Assuming that the governor of the translator is set so that the cam shaft completes one revolution in 125 milliseconds then, 5 milliseconds after the clutch magnet 500 (see Fig. 18) is operated, the feeler pins 369 are fully restored and the selector bars 312 are in their lowermost position to position the selected push bar for operation. From the 5th to the 30th millisecond period, push bar bail 308 is operated to its advanced operated position and, at about the 17th millisecond period engages and operates the selected push bar 311 which has been lowered by its associated selector bar 312 in the alined notches of the code bars 333. From the 18th to the 38th millisecond period, the selector bars 312 are gradually being raised until all selector bars are clear of the code bars. The push bar bail 308 maintains the selected push bar 311 operated until approximately the 105th millisecond period. At the 42nd millisecond period, the code bars 333 start to restore and are fully restored at the 67th millisecond period. The tape is stepped to its next code position at the end of the 60th millisecond period and the pulse springs are closed from the 35th to the 85th millisecond period. The feeler pins 369 start to operate at the 68th millisecond period and are fully operated at the 92nd millisecond period at which time the code bars 333 start to operate. By the 105th millisecond period, the code bars are fully operated in readiness to select the same or another selector and push bar combination. From the 105th millisecond period to stop position, the feeler pins are being lowered and the deenergization of clutch magnet 500 stops the cam shaft at the end of 125 milliseconds in stop position. In this one revolution, the push bar, selected by a previous revolution, is operated and released and a new selection has been made which will be operated on a subsequent revolution. Fig. 12 shows only one set of springs operated by one of the push bars, while, in Fig. 18 is shown the entire group of spring sets operated by the individual push bars of the translator.

The sets of springs shown in Fig. 18 have labels corresponding to character or circuits function; such springs cause the Powers card punch to perforate or perform as shown by the circuits of Figs. 19, 20, 21 taken together. These sets of springs are connected to conductors forming a cable which terminates in a multi-terminal plug. This multi-terminal plug is adapted for connection with a female terminal block on the Powers punch. This plug and block connection is diagrammatically illustrated by the small blocked in circles on the conductors near the right hand side of Fig. 18. The clutch magnet 500, when operated, couples the drive shaft, which is continually rotated by the motor M, to the cam shaft 307 to cause the latter to rotate with the drive shaft and operate the translator to translate the successive perforations in the tape by operating the push bars and associated springs or contacts, corresponding to the coded perforations in the tape as set forth in Patent 2,087,674. The negative and positive sign symbols are shown to indicate connection to the negative and positive conductors 46 and 45 to which negative and positive current is furnished from the motor generator set of the card punch.

The tape translator is designed to operate in accordance with the perforations in the tape fed to it and is, therefore, made universal so that the translator can control all of the various function and punching operations of the associated card punch machine. It will, therefore, be noticed that this tape translator has more function contact spring assemblies for controlling the card punch than are needed when used in connection with the tape perforated by the bookkeeping-tape perforator combination shown in the instant application. This tape translator, however, can translate and operate the card punch in accordance with all the operations listed on the spring contact assemblies shown in Fig. 18 when the tape is perforated in accordance with the tape codes listed in the chart shown in the specification.

MECHANICAL DESCRIPTION OF POWERS CARD PUNCH

The Powers card punching machine, partially illustrated in Figs. 14, 14A, 14C, 14D and 14E, is a well-known card punching machine manufactured by Remington Rand, Inc. The invention in this application, in so far as it relates to the card punch, consists only of altered electrical control of the card punch and no claim is being made for any of the mechanical functions performed by the punch, since these mechanical features were developed prior to this invention by Remington Rand Inc. Any mechanical changes made to effect the new electrical control of the card punch will be pointed out hereinafter.

In general the Powers card punch is somewhat similar in mechanical construction to Patents 1,868,111, 1,883,986, and 1,985,101, except for slight changes to improve the mechanical operation. These mechanical changes are not considered a part of this invention and will, therefore, only be described to enable the new electrical circuit controls to be more fully understood.

The card punch shown in Figs. 14, 14A, 14C, 14D and 14E was developed by Remington Rand Inc. Several minor mechanical changes have been made in order to electrically control the card punch. These changes (Fig. 14) comprise an addition of arms 483 and 484 and the back space springs 401 and 402, the carriage-off-normal springs 403, the skip (tab) springs 405, a slightly different intermediate stop 419, a triple-numeric keyboard (Fig. 14B), the carriage control springs 481 and 482 (Fig. 21), and the punch keyboard switching key K4 (Fig. 21). All other mechanical features, including the 90 column arrangement of the set-basket (Fig. 14A), the skip and erase mechanical arrangements shown in Figs. 14C, 14D and 14E, were developed by Remington Rand Inc., and are shown herein since, at the time of filing this application, no patents have issued to Remington Rand Inc. showing these latest developments in the Powers card punch.

Patent 2,018,420 shows a Powers card punch provided with a set-basket to punch a 45, a 90, or a combined 45 and 90 column card. The skip, erase, and back-space mechanical arrangements, shown in the instant application, are improvements made by Remington Rand Inc. over earlier developments shown in the aforesaid patents. Patent 1,868,111 shows a card punch for punching two similar cards from a single setting of the set-basket. Patent 1,883,986 shows a "repeat" card punch for punching any number of cards from a single setting of the set-basket, as well as an early development of the "back-space" arrangement. Patent 1,985,101 also shows the arrangement for the so-called "trip-2" operation; while practically all of the above patents show "carriage return" in substantially the same form as used in the latest Powers card punch. Patent 2,018,420 (Fig. 11B) shows an "intermediate stop" arrangement which is only slightly different than the "intermediate stop" (419—469) of Fig. 6 of the instant application. These mechanical improvements, made by Remington Rand, above pointed out, are shown in Figs. 1 to 18, inclusive, of the Lasker Patent 2,124,178, but the circuits shown in Figs. 29 to 48, inclusive, of Patent 2,124,178, in so far as applicant is aware, are believed to be a later development than the circuits of the present invention shown in Figs. 16 to 22, inclusive, of this application.

Figs. 19 to 22, inclusive, show the new and improved detail circuit arrangement for electrically controlling the Powers card punch in accordance with the invention.

Since the purely mechanical features of the card punch are not a part of this invention and are well-known features of the Powers card punch, only a general description of the mechanical operations need be given.

Generally, the feeding means for the cards may be of any suitable construction for successively removing the cards one at a time from a stack and for delivering them to the feed rollers. The cards delivered from the card magazine enter a passage in the punching unit and abut an automatically operated stop which locates the card in punching position. A card check is provided by insulating the upper idling rollers from the frame of the punch and as long as there is no card in punching position the upper idling rollers engage the lower idling rollers and complete a circuit for card check relay 514 of Fig. 20 when there is no card in punching position. If a card is in punching position then the card acts as an insulating member so that the card check circuit is ineffective.

Since the punching mechanism of the Powers punch is well known, it is believed unnecessary to describe the construction and operation other than to state that the setting of the set-up bars, such as 432 (Figs. 14A, 14C and 14D) which control the individual punches is accomplished by a movable carriage 436 (Fig. 14) which is arranged to travel in a step-by-step escapement movement to successive rows of set-up bars. This carriage is provided with a plurality of plungers corresponding in arrangement and number to a record column on the cards, which in the preferred form is made up of twelve record positions. Associated with each of the plungers 429 (Figs. 14C and 14D) is a flexible rod 431 which extends to an individual solenoid magnet, such as magnets 1 to 12, inclusive (Fig. 19). The operation of any one of these solenoid magnets in the Powers punch operates its individual flexible rod 431 and plunger 429 to operate and lock the set-up bar 432 which is, at this time, directly below the arm 423 (Fig. 14C) of the operated plunger 429.

Figure 14:
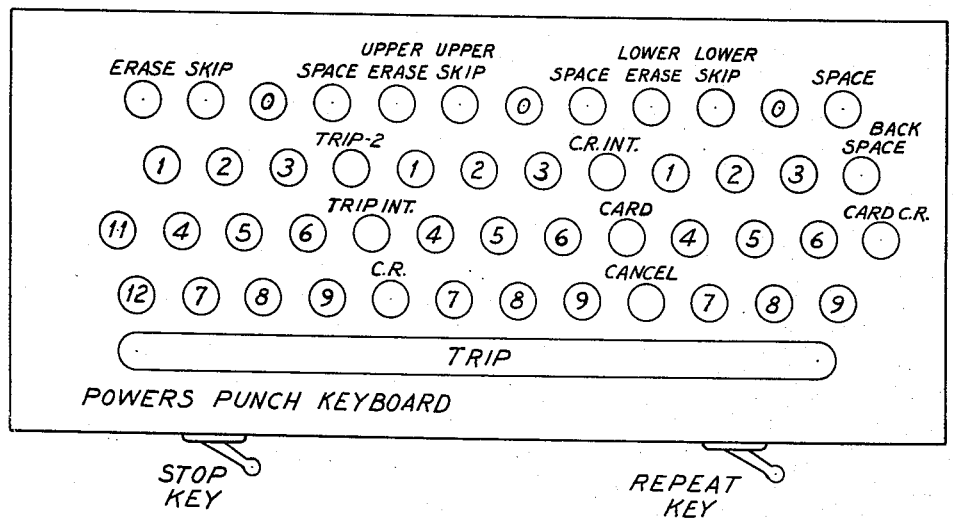
Fig. 14 shows a side view of the well-known 90 column Powers card punching machine.

The function magnets, comprising the space, upper erase, lower erase, upper skip, lower skip, intermediate stop, and cancel magnets are also equipped with flexible rods 431. The space magnet operates the universal bar 434 (Fig. 14) to step the carriage without operating any set-up bars. The upper and lower erase magnets operate plungers, such as plunger 424 (Fig. 14D), to depress certain set-up bars just far enough to unlock any previously locked set-up bars in the particular row directly below the plunger without locking the set-up bars depressed by the plungers. When the plungers, such as 424, have operated a predetermined distance pin 468 trips the catch 461 to cause the projections 438 and 437, slidably mounted on the plunger, to be released. The adjustment is such that the projection 437 is released at a time when the operated set-up bars 432 have been moved downward, so that the pins 466 (Fig. 14A) operate the locking bar 410 so as to release any previously operated and locked set-up bars in this particular row. The upper and lower skip magnets operate plungers, such as plungers 417 and 418, Figs. 14C and 14E) which respectively operate levers 414 and 415 in a position to engage with the settable (tab) skip stops 412 and 413. The operation of either skip magnet also releases the escapement to permit the carriage to move until either of the levers 414 or 415 engages one of the skip stops 412 or 413. The skip bar 411 is moved slightly to the right, as seen in Fig. 14E, to open springs 405 whenever the carriage is stopped in one of its skip stop positions. The intermediate stop magnet by means of its flexible rod 431 operates the rotatable catch 419 into the path of lug 469 on the carriage (Fig. 14) so as to stop the carriage, on its return, in a predetermined intermediate position. The cancel magnet operates the plunger 457 to rotate release lug 449 (Figs. 14 and 14A) to engage the release levers 452 which operate the locking bars 410 to unlock the locked set-up bars 432 when the carriage is returned.

The standard Powers punch has been altered in a manner similar to that shown in Lasker Patent 2,044,707 by providing two locking bars 410 for each row of set-up bars so that it is capable of being operated as a 45 or 90 column punch. That is, the punch is capable of punching a standard 45 column card in the well known manner and is also capable of punching 90 column cards in code. The punch is also capable of punching a combined 45 and 90 column card as shown in Fig. 15. Fig. 16 shows the well-known standard 45 column card. Fig. 17 shows a 90 column card in which the 45 columns are divided into two fields of 45 columns each. The first field comprises perforating positions 12, 11, 0, 1, 2, and 3, and the second field comprises the perforating positions 4, 5, 6, 7, 8, and 9.

Briefly the operation of the carriage is as follows: The marginal stop 445 (Fig. 14) is manually set on the notched bar 446 in a predetermined position corresponding to the first punching position in the upper field of a 90 column card. When the carriage is returned from a previous punching operation the bar 444 engages the lug 469 on the carriage to stop the carriage in this particular position which will hereafter be called the marginal stop position. When the carriage is returned as far as it will go to either marginal stop position or intermediate stop position a hard rubber bushing on bar 446 separates springs 403. Springs 403 are in reality off-normal springs which close on the first step of the carriage. The carriage is operated step by step in response to the operation of the first field magnets, such as magnets 12, 11, 0, 1, 2, and 3, (Fig. 19) and in response to the upper skip and space magnets. The set-up bars 432 in the first field are set and locked by locking bar 410 in response to the operation of the first field magnets. When the carriage reaches the end of its travel, the magnetic clutch and intermediate stop magnet are energized to automatically return the carriage to the intermediate stop position without restoring the locked set-up bars 432 in the first field since the releasing lug 449 was not rotated in the path of the levers 452. The carriage is thereafter operated step by step by the second field magnets, such as magnets 4 to 9, inclusive, to operate and lock the set-up bars 432 in the second field and by the operation of the lower skip and space magnets. When the carriage again reaches the end of its travel, the trip magnet and the cancel magnet are operated to cause the card to be punched in accordance with the locked set-up bars in both fields, after which, the magnetic clutch again operates to return the carriage to the set marginal stop position. The return of the carriage this time, due to the operation of the cancel magnet and lug 449, causes all the locked set-up bars in both fields to return to their normal positions when lug 449, by means of levers 452, operates the locking bars 410 to release the locked set-up bars 432. The punched card is ejected and a new card is positioned in a manner described in the aforementioned patents. When the carriage escapes from its 45th or 90th positions springs 481 (Fig. 21) close and springs 482 open. This arrangement is provided so that, in case the operator has made an error on the bookkeeping machine and notices it before skipping to the next column, the operator can correct it without causing the carriage of the punch to be returned to either the marginal or intermediate stop positions. The back space mechanism is operated in much the same manner as described in the aforementioned patents, but, in this case, the releasing lug 449 is not rotated when the carriage is back spaced. When the magnetic back-space clutch is energized, the ratchet bar 453 is moved to the left, as seen in Fig. 14, by means of link connection 409, rocker 454 and the link 455 connected to the back space clutch, to move the carriage back one step. Mounted on the carriage 436, is a pawl mechanism 439 for establishing a pick-up connection between the carriage and bar 453 during the back-space operations. Arms 483 and 484 are also rotated with rocker 454 to open springs 402 and close springs 401, during such operations, for a purpose to be more fully described in the circuit explanations. The trip magnet 518, upon operating, momentarily removes the stop 456 (Fig. 14) from in engagement with the clutch stop 460 to permit rotation of the cam shaft of the punch. The rotation of the cam shaft causes the card to be punched and ejected in the well known manner. The automatic carriage return cam springs 586 (Fig. 21) completes a circuit for energizing the carriage return relay 511 which in turn comprises the circuit for operating the carriage return magnetic clutch 520 which causes the carriage to be returned to either its marginal or intermediate stop positions. When the carriage reaches either of these positions, the stop bar 446 operates contacts 403 to unlock the operated carriage return relay 511, which then opens the circuit to clutch 520. All of the apparatus of the punch is now in normal position and may be used for punching a different card, it being understood that a new card has been positioned in punching position in the manner described in the aforesaid Lasker patents.

Fig. 14B shows the triple-numeric keyboard which is used by an operator when it is desired to operate the punch directly from such keyboard. This key-board is somewhat similar to the mechanical construction of the keyboard shown in Patent 1,985,101, with the exception that the number of keys and the number of spring contacts have been increased, as illustrated in Figs. 14B and 22.

In Fig. 19 is shown the transfer relays 501 to 504, inclusive, which, when operated, transfer the operation of the punch from 45 column working to 90 column working. On the right-hand side is shown the so-called punch magnets 1 to 12, inclusive, and the function magnets 13 to 19, inclusive, of a Powers punch. The full black circles indicate keyboard jack connections connected to correspondingly indicated full black circles in Fig. 22 which are connected to the springs, or contacts, operated by the keys of the Powers punch.

In Fig. 20 the punch operation relays 505 to 515, inclusive, are relays which control the new and improved circuits for causing certain machine functions to be accomplished. Three of these relays, as indicated by the lower crosshatched portion, are of the slow-to-release type of relay. A 90 column push button in the upper left-hand portion of Fig. 20 is provided to convert this Powers punch from 45 to 90 column working when operated.

In Fig. 21 is shown the receiver shift and trip magnets, the carriage-return and back-space magnetic clutches, and the motor generator set of the card punch. The card check, shown in Fig. 21, diagrammatically illustrates the frame of the punch, having positive battery connected to the lower idling rollers, which engages the upper idling rollers when no card is in punching position. Springs 481 are closed by a cam when the carriage of the punch reaches its 46th (or 91st) position, while springs 482 open in this position. Skip springs 405 are controlled by the skip bar 411 and arm 407 to momentarily open at the time the carriage of the punch is stopped in one of its skip stop positions in order to start a new punch setting operation. Springs 403 are really off-normal springs which close when the carriage is moved one step from its marginal or intermediate stop positions. Back-space springs 401 and 402 are controlled by the back space arms 483 and 484 when the back space magnetic clutch 519 operates to step the carriage back one space to make a correction. Springs 585 and 586 are controlled by cams on the cam shaft of the Powers punch. The two-way key K4 comprises two sets of springs, the upper springs being closed when the punch operator desires to operate the punch from the keyboard and the lower springs, which are closed when the punch operator desires to translate perforations in the tape to operate the Powers card punch.

Fig. 22 shows the wiring of the spring contacts of the triple-numeric keyboard, as seen from below, and, therefore, the key spring contacts are shown reverse to the keys of Fig. 14B. In addition, the wiring connections of the trip, stop and repeat keys are shown. The wire connections from these key spring contacts terminate in full black circles which are keyboard jack connections which are in electrical connection with the correspondingly numbered full black circles shown in Figs. 19 to 21, inclusive.

BOOKKEEPING MACHINE AND TAPE PERFORATOR CIRCUITS

Referring now to Figs. 16 and 17, a description of the circuit operations of the Remington bookkeeping machine and cable connected tape perforator will be given. The operator inserts the sheet to be typed and then operates the start key K(s) of the bookkeeping machine and start key K1 of the tape perforator to their "on" positions. The operation of key K(s) starts the motor of the bookkeeping machine and also connects positive battery to conductor 30 while the operation of key K1 starts the motor 157 of the tape perforator. The sheet to be typed is ruled and divided into columns, each having the required number of typing positions therein for the largest possible amount to be typed in such columns. The operator first operates the carriage return key to cause the tape perforator to perforate the "trip upper" code, having tape code #2, not to be confused with the "trip—2" contacts mentioned elsewhere, in the tape so that during translation of the tape, the card punch will be ready to punch a 90 column card instead of 45 and so that a card will be in punching position. The operation of the carriage return key also positions the carriage of the bookkeeping machine in its first typing position. The operator thereafter operates the numeral or character keys, space, tabulator palm skip, the decimal tabulator keys, and the back space key to cause the bookkeeping machine to type the desired entries in the proper column positions on the inserted sheet. After each numeral, character, or space key operation the carriage is automatically stepped one position. After completing the entry comprising a plurality of digits in the first desired column, the operator operates the palm skip tabulator or a particular decimal tabulator key to cause the carriage of the machine to skip to the next column to a particular typing position therein. The tabulator skip stop may be set to stop the carriage in any predetermined typing position for a given column and therefore by the operation of the palm skip tabulator the carriage automatically skips to the next predetermined skip stop position in the well known manner. In case a decimal tabulator key is operated then the carriage skips to this corresponding decimal typing position in the next column in the well known manner. Regardless of whether the palm tabulator skip key or one of the decimal tabulator keys is operated, the skip springs 120 and 121 are operated when bail 60 is operated by cam 65 on shaft 66. The circuits associated with these skip springs and the control bar springs 123 are so designed that, regardless of whether a decimal tabulator key or the palm skip tabulator is operated, the proper skip perforations are punched in the tape as will be pointed out in the detail circuit descriptions.

Assuming now that the operator has started the motors of the bookkeeping machine and the tape perforator and has properly alined the sheet for typing. The operator first operates the carriage return key to cause the bookkeeping carriage to be positioned in its first typing position and closes springs 144 to complete a circuit for energizing the #2 code relay, "trip upper", in the tape perforator as follows: from positive battery, key "K(s)" in "on" position, springs 144, cable conductor 2, normally closed springs controlled by the upper armature of #2 code relay and through the winding of this relay to negative battery. Code relay #2 operates its armatures and bar 214 below the #2 punch of the tape perforator. At its upper armature code relay #2 completes a locking circuit for itself independent of cable conductor 2, from the upper armature of the hold relay, the upper armature and front contact of code relay #2, and the associated resistance and winding of code relay #2. Code relay #2 at its lower armature completes a circuit for operating the trip magnet as follows: from positive battery, lower armature of code relay #2, lower armature and back contact of the hold relay, and through the winding of trip magnet to negative battery. The trip magnet energizes and operates its armature 175 (Fig. 5) to trip catch 169 into the rotating clutch 168 to cause the cam shaft 163 to rotate. The first quarter revolution of shaft 163 operates the punching plates 187 and 190 causing anvil 192 to engage the operated #2 bar 214 and operate the #2 punch 197 to perforate the tape with a #2 perforation. After cam 181 lowers the operated #2 punch and plates 187 and 190, cam 182 advances the tape one step to its next perforating position. Cam 164 closes springs 166 shortly after the energization of the trip magnet, thereby completing a circuit for energizing the hold relay as follows: from positive battery, springs 166, normally closed springs controlled by the lower armature of the hold relay, and through the winding of hold relay to negative battery. Hold relay, upon energizing, at its lower armature and back contact opens the circuit to the trip magnet to deenergize the same, and at its front contact completes a locking circuit for itself through the associated resistance and the lower operated armature of #2 code relay. Hold relay at its upper armature opens the locking circuit to the operated #2 code relay to cause the deenergization of this relay in case the carriage return springs 144 are open. In case springs 144 are still closed, then #2 code relay is maintained energized over its original energizing circuit and the associated resistance instead of its normally closed contacts. As soon as the hold relay energizes, the trip magnet deenergizes and releases the catch 169 to stop cam shaft 163 on the completion of one revolution. When #2 code relay deenergizes and withdraws its code bar 214 from under the corresponding punch 197, said relay, at its lower armature, opens the locking circuit to the hold relay to cause the latter relay to deenergize. The hold relay, at its upper armature, again prepares the locking circuits for the next code relays to be operated and, at its lower armature, prepares the circuit for operating the trip magnet for the next perforating operation. From the foregoing, it will be seen that, as a result of the operation of carriage return springs 144, a #2 perforation has been punched in the tape. The operation of any character key causes the corresponding numeral (or character) to be typed on the sheet in this position and thereafter causes the carriage to step one step to next position as previously described. Assuming that numeral key 1 was the key operated, then the springs 127 and 122 are closed by the operation of plunger 49 of the bookkeeping machine as previously described. The closure of these springs is effective for operating the tape perforator only in case the control bar springs 123 are closed by a projection on control bar 134. Assuming for the time being that the roller 128 (Fig. 2C and 16) is in one of the recesses of the control bar, then the closure of springs 127 and 122 is ineffective to control any of the code relays of the tape perforator. After typing the required data in the first column the carriage is operated to the next column to a certain typing position by operation of either the palm skip tabulator or a decimal tabulator key.

Assuming now that all entries on this new column are also to be recorded on the tape in the tape perforator, then a projection 137 (Fig. 2C) on control bar 134 has operated springs 123. The closure of springs 123 completes a circuit for energizing skip relay 140 as follows: from positive battery, key K(s) in "on" position, carriage return springs 148, control bar springs 123, common conductor 40, normally closed springs 120, normally closed springs controlled by armature 136 and through the winding of relay 140 to negative battery. At armature 135, relay 140 prepares a point in the circuit for connecting positive battery to cable conductor 6 and at armature 136 opens its original energizing circuit after closing a locking circuit for itself extending through armature 126 to conductor 150 which is connected to positive battery. The lamp L is connected to common conductor 40 and is therefore lighted whenever springs 123 are closed to indicate to the operator that the tape perforator and bookkeeping machine are operatively connected. Now, when the operator operates a numeral key, say No. 1, then, when springs 127 and 122 are closed, a circuit for operating code relays 2 and 4 of the tape translator may be traced as follows: from positive battery, key K(s) in "on" position, through the carriage return springs 148, closed control bar springs 123, common conductor 40, through springs 127 and 122 to cable conductors 2 and 4 in multiple, the normally closed springs controlled by the upper armatures of code relays 2 and 4, and the windings of relays 2 and 4 in multiple to negative battery. Code relay No. 2, upon energizing, operates its armatures and bar 214 below the No. 2 punch of the tape perforator. Code relay No. 4 likewise, upon energizing, positions its bar 214 below the No. 4 punch. Code relay No. 2, at its upper armature, completes a locking circuit for itself extending from the upper armature of the hold relay, upper armature of code relay #2, through the associated resistance and the winding of this relay to negative battery. Code relay #4 at its upper armature closes a similar locking circuit for itself. The opening of the normally closed springs controlled by the upper armatures of code relays No. 2 and No. 4 includes the associated resistances in the original energizing circuits of these relays. At the lower armatures of code relays No. 2 and No. 4 a circuit is completed for energizing the trip magnet of the tape perforator as follows: from positive battery through the lower armatures of relays 2 and 4, lower armature and back contact of the hold relay and through the winding of the trip magnet to negative battery. Trip magnet, upon energizing, operates its armature 175 to trip the catch 169 into the rotating clutch 168 as previously described in connection with Fig. 5 to cause the shaft of the tape perforator to rotate. The first quarter revolution of cam shaft 163 operates the punching plates 187 and 190 thereby causing the anvil 192 to engage the operated #2 and #4 bars 214 and operate the #2 and #4 punches 197 to perforate the tape with #2 and #4 perforations. Cam 182, on shaft 163, advances the tape one step to its next perforating position after the punches 197 are lowered. Cam 164 closes springs 166 shortly after the energization of the trip magnet thereby completing a circuit for energizing the hold relay as follows: from positive battery, cam springs 166, normally closed spring controlled by the lower armature of the hold relay, and through the winding of the hold relay to negative battery. Hold relay, upon energizing, at its lower armature and back contact opens the circuit to the trip magnet to deenergize the same and at its front contact completes a locking circuit for itself through the associated resistance. Hold relay at its upper armature opens the locking circuit to the operated #2 and #4 code relays to cause the deenergization of these relays in case the springs 127 and 122 of the bookkeeping machine are opened at this time. Although springs 127 and 122 open shortly after their closure, as previously described, regardless of the actuated condition of the #1 numeral key, the circuits of the code and hold relays of the tape perforator are so designed that a continued closure of springs 127 and 122 results in only one perforating operation since the hold relay is held in locked position as long as any one of the code relays is held operated. The hold relay controls the circuit of the trip magnet and therefore a second perforating operation cannot take place until the hold relay deenergizes. As soon as the hold relay energizes, the trip magnet deenergizes and releases the catch 169 to stop the cam shaft 163 on the completion of one revolution.

The operated code relays deenergize when the operated bookkeeping machine springs, such as springs 127 and 122, and their locking circuits are opened to withdraw their bars 214 from under the corresponding punch and, at their lower armatures opens, the locking circuit to the hold relay. The hold relay, upon deenergizing, at its upper armature prepares a locking circuit for the code relay next to be operated and, at its lower armature, prepares the circuit for operating the trip magnet for the next perforating operation. From the foregoing it will be seen that, in response to the operation of numeral key No. 1, at a time when control bar springs 123 are closed, code relays #2 and #4 are operated and the cam shaft is operated in one revolution to perforate the tape with #2 and #4 perforations. In a similar manner, the operation of any other key of the bookkeeping machine closes its associated springs to operate the proper code relays, in case the control bar springs 123 are closed, to cause corresponding coded perforations to be punched in the tape. As for example, the operation of numeral key #2 completes circuit for energizing code relays #3 and #5 which cause #3 and #5 perforations to be punched in the tape. The operation of the space key closes the space springs to operate code relays #1 and #6 and perforate the tape with #1 and #6 perforations. The operation of the back space key steps the carriage of the bookkeeping machine back one space and closes the back space springs to operate code relays #2 and #6 and perforate the tape with #2 and #6 perforations. The springs of the bookkeeping machine are shown connected to conductors having numbers corresponding to the code relays such conductors are connected to. The associated chart shows the code relays operated and the corresponding perforations for each character or function.

The control bar 134 is provided with recesses at the typing positions corresponding to the decimal points and to the line points separating the different columns and therefore the control bar springs 123 are open in such position so that the operation of the space key in such position does not cause a corresponding punching operation in the tape perforator. No space perforation is desired for the decimal points because, in translating the perforated tape to punch a record card, no provision is necessary for separating the dollars and cents on the card since the columns the cards are punched in determines the numerical value.

After the operator has typed the data in a given column, she then operates the palm skip tabulator or a decimal-tabulator key to cause the carriage of the machine to skip to a certain position in the next column to be typed. The operation of either the palm skip tabulator or a decimal tabulator key causes the operation of skip springs 120 and 121 as previously described and, since relay 140 is locked energized at this time, a circuit for operating relay 141 and #6 code relay is completed. The circuit for operating relay 141 extends from positive battery, key K(s), springs 148, conductor 150, skip springs 121, armature 135, and through the winding of relay 141 to negative battery. A branch of this circuit extends from armature 135, over cable conductor 6, normally closed springs controlled by the upper armature of #6 code relay and through the winding of this relay to negative battery. Relay 141 at armature 125 maintains the circuit to #6 code relay independent of armature 135 and at armature 126 opens the locking circuit of relay 140, which thereupon deenergizes. At armature 135 relay 140 opens the original circuit to relay 141 and #6 code relay but these relays are maintained operated over armature 125 as long as skip springs 121 are closed. At armature 136 relay 140 opens a further point in its locking circuit and at its normally closed springs prepares its original energizing circuit.

The operation of the #6 code relay causes the operation of the trip magnet which releases the cam shaft to cause a #6 perforation to be punched in the tape and to energize the hold relay as previously described. The operation of the hold relay releases the trip magnet to stop the cam shaft after completing one revolution and when the code relay is deenergized, the hold relay also deenergizes. From the foregoing it will be seen that, in response to the operation of skip springs 121 at a time when relay 140 is locked energized, a #6 or a skip perforation is punched in the tape. When the skip springs are restored to normal, the opening of springs 121 opens the circuit to relay 141 and #6 code relay to deenergize such relays. At springs 120, the original energizing circuit of relay 140 is again completed if control bar springs 123 are closed at this time.

In case the number to be entered in this new column is one digit greater than that which the tabulator stop has been set at, and the machine carriage has skipped beyond the desired typing position, then the operator operates the back space key to back space the carriage one position. The operation of the back space key causes the operation of the back space springs to operate #2 and #6 code relays which cause the back space code 2 and 6 to be perforated in the tape.

In another instance, the number to be entered in this new column may be one or more digits less than that which the tabulator stop has been set at, and therefore, the operator must operate the space key to space the carriage to the proper position and to operate the tape perforator to perforate the space code 1 and 6. Assuming now, however, that the operator makes an error and types a numeral in a position in which no entry should be made. In this case the operator must back space and operate the erase key to close the erase springs. In the same manner as previously described, the operation of the back space springs, followed by the operation of the erase springs, causes the tape perforator to perforate the back space code 26 followed by an erase code 36. This operation is necessary so that the card punch can erase the wrong entry from the set-up basket in the card punch as will be more fully described in the card punch operation.

The remaining columns of the sheet are typed with data, in the same manner as described, with the exception of those columns in which credit entries are to be made. In order to make a credit entry in a certain column, the operator operates the credit shift key which locks operated and closes its shift springs. The operation of the numeral keys now cause corresponding credit entries to be made in this column in the well known manner. When the last numeral key, or the cents key, for this entry is actuated, the carriage steps from this position to the next. During this movement, the projection 139 (Fig. 2C) on the control bar operates roller 133 to close springs 124 which complete a circuit for operating #5 code relay as follows: from positive battery, key K(s), conductor 30, springs 148, conductor 150, control bar springs 124, left-hand normally closed back space springs, credit shift springs, cable conductor 5, normally closed springs controlled by the upper armature of #5 code relay and through the winding of this relay to negative battery. In a similar manner, code relay #5, upon energizing, locks and operates the trip magnet to cause a credit perforation (5) to be punched in the tape. Cam springs 166 likewise operates the hold relay to release the trip magnet after which the code relay and hold relay deenergize. After completing the credit entries, the operator releases the credit shift key thereby opening the credit shift springs so that closure of springs 124 is ineffective to cause credit perforations in the tape.

In case the operator discovers an error of such a nature that it would require too many back space and erase operations to correct the same, she may operate a cancel key to close the cancel springs. The closure of the cancel springs completes circuits for energizing the #4, #5, and #6 code relays which cause the cancel perforation code 456 to be punched in the tape in a manner similar to that previously described.

When the operator makes the last entry in the last column on the sheet, she will then operate the carriage return key to cause the carriage of the bookkeeping machine to be returned to its first column and to close carriage return springs 144 which causes the operation of #2 code relay to perforate a trip upper code 2 in the tape as previously described. During the return of the carriage, springs 148 are opened to cause the release of relay 140, if operated, and to prevent transmission of a code to the tape perforator in case a key should be accidentally operated.

It will be understood from the foregoing description that the tape perforator is only controlled by the closure of the bookkeeping contact spring at a time when the control bar contacts 123 are closed. It will be seen, from the circuits shown in Fig. 16, that positive battery potential is not connected to the heavy common conductor 40 to furnish operating battery to the key contact springs until the control bar contacts 123 are closed. The control bar contacts 123 are controlled by the roller 128 (Fig. 2C) sliding into the indentations 138 to open contacts 123, and, therefore, in these typing positions of the bookkeeping machine, corresponding to the indentations 138, the operation of the contact spring assemblies are ineffective to operate the tape perforator. However, portions 137 of the control bar 134 operate on roller 128 to cause the closure of spring contacts 123 and it is in these corresponding typing positions that positive battery is connected through springs 123 to the common conductor 40 so that the operation of the key contact springs control the operation of the tape perforator. The raised portions 137 of bar 134, therefore, correspond to only the typing positions of the bookkeeping machine which effectively operate the tape perforator. Other control bars, having differently located recesses 138 and raised portions 137, may be provided so that any desired typing position may operate the tape perforator or not, as desired. In the instant application, the recesses 138 of the control bar 134 correspond to the typing positions in which alphabetical keys are actuated, and, therefore, the tape is not perforated in accordance with the alphabetical keys actuated. It being understood from the above description, that a different control bar could be furnished having raised portions 137 in the alphabetical key actuated positions, and, if so furnished, then the alphabetical key actuations would control the tape perforator to punch the code holes designated in the chart on Fig. 16.

It will be noticed that Fig. 16 does not show all of the numerical and alphabetical key contact spring assemblies because it will be apparent, from the contact spring assemblies shown and the chart how the remaining contact spring assemblies are wired. For example, referring to the chart and to numeral 3 character, having a code 46, it will be seen that numeral 3 contact spring assembly will complete circuits from the common conductor 40 to the #4 and #6 wires in the cable extending to the tape perforator. Also, the chart for character letter "R" indicates a code 134 and, therefore, letter "R" contact spring assembly will complete circuits from the common conductor 40 to the #1, #3 and #4 wires in the cable extending to the tape perforator. The remaining numeral and letter contact spring assemblies (not shown) are connected to wires in the cable extending to the tape perforator in accordance with the numerals in the designated tape code of the chart.

In case the tape should break or be exhausted, then when the tape 147 is stepped far enough, roller 236 is engaged by wiping spring 235 to complete a circuit for operating the key lock magnet (Figs. 2 and 16) of the bookkeeping machine. The operation of this magnet locks the numerical keys of the bookkeeping machine from operation as previously described.

The tape feed push key, shown in Fig. 17, is provided to enable the operator to punch only feed holes in the tape as long as the push key is held operated. The operation of this key completes an obvious circuit for energizing the trip magnet, which causes the operation of the tape perforator to punch only the feed holes, since none of the code relays are operated at this time.

TAPE TRANSLATOR CIRCUITS

In order to describe the manner in which the tape translator, shown in Fig. 18, controls the Powers punch, shown in Figs. 19 to 21, inclusive, it will be assumed that the tape punched by the combined operations of the bookkeeping machine and tape perforator is properly inserted in the tape translator. The operator then operates key K6 to operate motor M of the tape translator and also operates key K5 to prepare the circuit for the tape translator clutch magnet 500. The key K3 on the Powers punch (Fig. 21) is closed to start and operate the motor-generator set to supply operating current. Key K4 (Fig. 21, right) is operated to translator position to close springs 595 to 597, inclusive. Springs 597 prepares the circuit to upper erase magnet 16. Springs 596 connects positive battery to conductor 614. Springs 595 completes the circuit for clutch magnet 500 as follows: from positive battery, springs 596, conductor 614, armatures 550, 553, 556, 563, 571, 576, and 579 and their back contacts, conductor 613, springs 595, conductor 617, armature 584, cable conductor 44, key K5, and through the winding of clutch magnet 500 to negative battery.

By the operation of clutch magnet 500, the cam shaft of the tape translator is operated to cause the feeler pins to sense the perforations in the tape and to operate the push bar corresponding to the sensed perforations as previously described.

Before proceeding with the detail circuit explanations, it should be stated that the circuits are arranged so that the Powers punch is universal and may be operated from its keyboard or from the tape translator, in either case to punch 45 or 90 column cards or part 45 column and the remainder 90 column as desired. The circuits are normally set for 45 column working but are convertible to 90 column working by the operation of the upper and lower transfer relays 501 to 504, inclusive. The operation of the character (numeral or letter) push bars of the tape translator close contacts for operating the punch magnets in accordance with 45 column operation, in case the upper or lower transfer relays are not operated. In case the upper transfer relays 501 and 502 are operated, then the closure of the numerical character push bar springs close circuits for operating the punch magnets to set the set-up bars to punch a 90 column card in its upper field. In case the lower transfer relays 503 and 504 are operated, then the closure of the numerical character push bar springs close circuits for operating the punch magnets to set the set-up bars to punch a 90 column card in its lower field. The upper transfer relays 501 and 502 energize when positive battery is connected to "upper" conductor 41, while the lower transfer relays 503 and 504 energize when positive battery is connected to the "lower" conductor 42.

The circuits shown in Figs. 18 to 21, inclusive, are arranged to cause the card punch to punch a 45 column record card with both alphabetical and numerical coded perforations and a full 90 column record card with only numerical coded perforations. That is, whenever these circuits are used to punch alphabetical coded perforations, such perforations are punched in only a 45 column record card or in the 45 column portion of a combined 45 column and 90 column record card as shown in Fig. 15.

The closure of certain push bar springs causes different operations of the punch dependent upon the condition of the transfer relays. Therefore, in describing the different circuit operations, the first description will describe the 45 column working, the second description will describe the working in the upper field at a time when the upper transfer relays 501 and 502 are operated for 90 column working, while the third description will describe the working in the lower field at a time when the lower transfer relays 503 and 504 are operated for 90 column working.

The following chart shows the number of the push bar that is operated for a given character or function code in the tape and the operations of the punch relays and magnets for 45 and 90 column working in response to the closure of the associated push bar springs:

CHART

| Push Bar No. | Character or function | Tape code | Punch relays and magnets operated | | |
|---|---|---|---|---|---|
| 1 | Trip | 1 | 513–518 | | |
| 2 | Trip upper | 2 | 518–513 | | |
| 3 | Trip inter | 3 | 518–512–513 | | |
| 4 | Car. return | 4 | 511 | | |
| 6 | Int. stop | 1256 | 512 | | |
| 7 | Cancel | 456 | 511–513 | | |
| 8 | Cancel int | 1234 | 511–512–513 | | |
| 12 | Card car. ret. int | 256 | 518–512 | | |
| 13 | Card car. ret | 246 | 518 | | |
| 14 | Card | 245 | 509–518 | | |
| 15 | Car. ret. int. lower | 236 | 511–512 | | |
| 17 | Back space | 26 | 507 | | |
| 18 | Car. ret. lower | 235 | 511 | | |
| 19 | Car. ret. int | 1346 | 511–512 | | |
| 20 | Skip | 6 | 505 (515) | | |
| 21 | Space | 16 | 13 | | |
| 45 | Trip-2 | 2345 | 510–513 | | |

| | | | Punch relays and magnets operated | | |
|---|---|---|---|---|---|
| | | | | 90-column | |
| | | | 45-column | Upper 501 and 502 operated | Lower 503 and 504 operated |
| 5 | Credit | 5 | 10-16-17 | 12-16 | 4-17 |
| 9 | 45-column | 356 | | Unlock 501-502 | Unlock 503-504 |
| 10 | Lower | 346 | 503-504 | 503-504 | |
| 11 | Upper | 345 | 501-502 | | 501-502 |
| 16 | Erase | 36 | 16-17-13 | 16-13 | 17-13 |
| 44 | A or 11 | 14 | 11-16-17 | | |
| 43 | B or 0 | 13 | 0-16-17 | 12-16 | 4-17 |
| 42 | C or 1 | 24 | 1-16-17 | 11-16 | 5-17 |
| 41 | D or 2 | 35 | 2-16-17 | 11-3-16 | 5-9-17 |
| 40 | E or 3 | 46 | 3-16-17 | 0-16 | 6-17 |
| 39 | F or 4 | 15 | 4-16-17 | 0-3-16 | 6-9-17 |
| 31 | G or 5 | 12 | 5-16-17 | 1-16 | 7-17 |
| 37 | H or 6 | 23 | 6-16-17 | 1-3-16 | 7-9-17 |
| 36 | I or 7 | 34 | 7-16-17 | 2-16 | 8-17 |
| 35 | J or 8 | 45 | 8-16-17 | 2-3-16 | 8-9-17 |
| 34 | K or 9 | 56 | 9-16-17 | 3-16 | 9-17 |
| 33 | L or 12 | 25 | 12-16-17 | | |
| 32 | M | 123 | 12-11 | | |
| 31 | N | 124 | 12-10 | | |
| 30 | O | 125 | 12-1 | | |
| 29 | P | 126 | 12-2 | | |
| 28 | R | 134 | 12-3 | | |
| 27 | S | 135 | 12-4 | | |
| 26 | T | 136 | 12-5 | | |
| 25 | U | 145 | 12-6 | | |
| 24 | W | 146 | 12-7 | | |
| 23 | X | 156 | 12-8 | | |
| 22 | Y | 234 | 12-9 | | |

NUMERAL OPERATION

Assuming that the first coded perforations encountered by the feeler pins of the translator is the code for digit 1, or perforations 2 and 4, then the push bar for this code operates the springs indicated C and 1 (Fig. 18) to prepare circuits for punch magnets 1, 11 or 5 and for the upper and lower erase magnets 16 and 17, dependent upon whether the punch is set for 45 or 90 column working. Shortly after the operation of this push bar, the pulse cam on cam shaft 307 closes the pulse springs to momentarily connect positive battery to pulse conductor 43 and through the operated springs to cable conductors 1 and 16.

For 45 column working, the circuit extends over cable conductor 1, armature 522 and back contact, armature 536 and back contact, and through the winding of punch magnet 1 to negative battery. Positive battery on erase conductor 16 extends by way of armature 532 and through the winding of lower erase magnet 17 to negative battery and by way of conductor 16, armature 544, conductor 598, key springs 597, conductor 599 and through the upper erase magnet 16 to negative battery.

For 90 column working, when the upper transfer relays 501 and 502 are operated, the circuit extends over cable conductor 1, armature 522 and front contact, and through the winding of punch magnet 11 to negative battery. Since upper transfer relay 502 is operated, said relay at armature 532 opens the circuit to the lower erase magnet 17 with the result that only the upper erase magnet 16 is operated over the previously traced circuit. Therefore, during 90 column working in the upper field only, only the upper erase magnet 16 is operated.

For 90 column working when the lower transfer relays 503 and 504 are operated, the circuit extends by way of cable conductor 1, armature 522 and back contact, armature 536 and front contact, and through the winding of punch magnet 5 to negative battery. Since the lower transfer relay 504 is operated, said relay at armature 544 opens the circuit to the upper erase magnet 16 with the result that only the lower erase magnet 17 is operated over the previously traced circuit. Therefore, during 90 column working in the lower field, only the lower erase magnet 17 is operated.

From the foregoing it will be seen, that punch magnet 1 and the upper and lower erase magnets 16 and 17 are operated for 45 column working, that punch magnet 11 and upper erase magnet 16 are operated for 90 column working in the upper field, and that punch magnet 5 and lower erase magnet 17 are operated for 90 column working in the lower field. The operation of the erase magnets cause the release of any previously operated and locked set-up bars in the row directly below the plungers of the carriage as previously described. The operation of #1, 11, or 5 punch magnet operates and locks the corresponding set-up bar in the row directly below the operated plunger and operates the universal bar to cause the carriage to escape one step to position the plungers over the next row of set-up bars as previously described.

In a similar manner, the operation of the D and 2 push bar springs connects the pulse conductor 43 to cable conductors 39, 16 and 2 to cause the operation of punch magnet 2 and erase magnets 16 and 17 for 45 column working, the operation of punch magnets 11 and 3 and the upper erase magnet 16 for the upper field 90 column working, or the operation of punch magnets 5 and 9 and lower erase magnet 17 for the lower field 90 column working. The circuit for operating punch magnet 2 extends from positive battery, pulse springs, pulse conductor 43, left-hand operated springs, cable conductor 2, armature 523 and back contact, armature 537 and back contact, and through the winding of punch magnet 2 to negative battery. The circuit for operating magnet 11 extends from pulse conductor 43, left hand springs, cable conductor 2, armature 523 and front contact, and through the winding of punch magnet 11 to negative battery. The circuit for operating magnet 3 extends from pulse conductor 43, the right-hand operated push bar springs, cable conductor 39, armature 538, and through the winding of punch magnet 3 to negative battery. The circuit for operating punch magnet 5 is the same as that previously traced to cable conductor 2 and from there by way of armature 523 and back contact, armature 537 and front contact, and through the winding of punch magnet 5 to negative battery. The circuit for operating punch magnet 9 is the same as that traced to cable conductor 39 and from there by way of operated armature 543 through the winding of punch magnet 9 to negative battery. The erase magnets are operated over the circuits previously traced. The operated punch and erase magnets operate the punch in the same manner as previously described.

The remaining numerical or character push bar springs close circuits to the different magnets of the punch as may be seen on the drawing, and as indicated on the above chart. Since these springs close circuits somewhat similar to the circuits traced for the two previously described operated push bar springs, it is not thought necessary to describe all these in detail.

CHARACTER OPERATION

In case the tape is perforated by the alphabetical code shown in the chart, then when such tape is translated, the translations are punched in a 45 column card or the 45 column portion of a combined 45 and 90 column card. As will be seen from the chart, the push bar springs for characters A to L, inclusive, cause the operation of only one punch magnet while the remaining character push bars cause the operation of two punch magnets. The punch is set in 45 column working for character perforations and since these operations are somewhat similar to the numerical operations previously described it is not thought necessary to describe these operations in detail.

FUNCTION OPERATIONS

Trip

In response to the closure of the trip push bar springs the trip magnet 518 and the cancel relay 513 are operated. The circuit for operating the trip magnet 518 extends from positive battery, right-hand operated trip push bar springs, cable conductor 22, and through the winding of trip magnet 518 to negative battery. The circuit for operating cancel relay 513 extends from positive battery, left-hand operated trip springs, cable conductor 19, and through the winding of cancel relay 513 to negative battery. At armature 574 relay 513 prepares a circuit for cancel magnet 19, at armature 575 completes a locking circuit for itself from closed stop bar springs 403, which were closed on the first step of the carriage from either marginal or intermediate stop positions, at armature 576 and back contact opens the circuit to clutch magnet 500 to stop the operation of the translator, and at armature 576 and front contact completes a circuit for energizing card check relay 514. This circuit may be traced as follows: from positive battery, springs 596 of key K4 (Fig. 21), conductor 614, armatures 550, 553, 556, 563, and 571 and their back contacts, armature 576 and front contact, and through the winding of card check relay 514 to negative battery. Card check relay 514 at armature 579 opens a further point in the circuit to clutch magnet 500 and at armature 580 opens a point in the circuit to the keyboard jack connection 732 terminating the common function key conductor. Trip magnet 518, upon operating, momentarily removes the stop 456 (Fig. 14) from engagement with the clutch stop 460 to permit the rotation of the punch cam shaft of the punch. The rotation of the cam shaft causes the card in punching position to be punched in accordance with the locked set-up bars and ejected in the well known manner. The automatic carriage return cam springs 586 (Fig. 21) are closed in response to the operation of the cam shaft to complete a circuit for energizing carriage return relay 511 as follows: from positive battery, springs 596, cam springs 586, conductor 611, armatures 567 and 562, and through the winding of carriage return relay 511 to negative battery. At armature 569, relay 511 completes the circuit for energizing cancel magnet 19 and the carriage return magnetic clutch 520, at armature 570 locks itself to operated stop bar springs 403 over conductor 606, and at armature 571 opens a further point in the circuit to clutch magnet 500 as well as maintaining said check relay 514 in operated position. The circuit for energizing cancel magnet 19 extends from positive battery, stop bar springs 403, conductor 606, armature 569, armature 574, conductor 589 and through the winding of cancel magnet 19 to negative battery. The circuit for energizing the carriage return magnetic clutch 520 extends from positive battery, springs 403, conductor 606, armature 569, conductor 605, and through the windings of the carriage return magnetic clutch 520 to negative battery. Cancel magnet 19 operates plunger 457 (Fig. 14) to rotate release lug 449 (Fig. 14A) in the path of levers 452 to operate the same during the carriage return to unlock any operated set-up bars 432 by operating the locking bars 410. The operation of the carriage return magnetic clutch 520 causes the carriage to be returned to its marginal stop position, at which time the stop bar is operated to open springs 403 to open the locking circuits of the carriage return and cancel relays 511 and 513 and to open the circuit to magnetic clutch 520. At armatures 571 and 576 relays 511 and 513 opens the circuit to card check relay 514 which, upon deenergizing after an interval, at armature 579 again establishes the circuit for energizing the tape translator clutch magnet 500 to operate the cam shaft of the translator another revolution. The rotation of the punch cam shaft also causes the insertion of a new card in punching position in the well known manner. In case no card is inserted in punching position, then the idling rollers of the punch close an obvious circuit to maintain card check relay 514 operated to prevent further operation of the tape translator. However, assuming that a new card is inserted in punching position then card check relay 514 finally deenergizes to reestablish the circuit to the translator clutch magnet 500 at armature 579.

Trip upper

In response to the closure of the trip upper push bar springs the trip magnet 518, the cancel relay 513, and the "upper" transfer relays 501 and 502 are operated. The right-hand springs connect positive battery to conductor 22 to energize the trip magnet 518 and the middle springs connect positive battery to conductor 19 to energize cancel relay 513. The closure of the left-hand springs connects positive battery to the "upper" cable conductor 41 to energize relays 501 and 502 in Fig. 19. The operation of the trip magnet 518 and cancel relay 513 cause the same operations to take place as described under the Trip function. Relay 501, upon energizing, at armature 521 transfers the cable conductor 10 from connection with punch magnet 10 to connection with punch magnet 12; at armature 522 transfers cable conductor 1 from connection with punch magnet 1 to connection with punch magnet 11; at armature 523 transfers cable conductor 2 from connection with punch magnet 2 to connection with punch magnet 11; at armature 524 transfers cable conductor 3 from connection with punch magnet 3 to connection with punch magnet 10; at armature 525 transfers cable conductor 4 from connection with punch magnet 4 to connection with punch magnet 10; and at armature 526 transfers cable conductor 5 from connection with punch magnet 5 to connection with punch magnet 1. Relay 502, upon energizing, at armature 527 transfers cable conductor 6 from connection with punch magnet 6 to connection with punch magnet 1; at armature 528 transfers cable conductor 7 from connection with punch magnet 7 to connection with punch magnet 2; at armature 529 transfers cable conductor 8 from connection with punch magnet 8 to connection with punch magnet 2; at armature 530 connects cable conductor 39 to punch magnet 3; at armature 531 transfers cable conductor 9 from connection with punch magnet 9 to connection with punch magnet 3; at armature 532 disconnects erase conductor 16 from lower erase maget 17; at armature 533 opens a point in the locking circuit for the lower transfer relays 503 and 504; and at armature 534 completes a locking circuit for maintaining itself and relay 501 operated. This locking circuit may be traced as follows: from positive battery through the normally closed 45 column push bar springs to cable conductor 40, armature 545, armature 534 and through the windings of relays 501 and 502 in parallel to negative battery. The upper transfer relays are maintained in operated position over this locking circuit until the 45 column push bar springs are opened or until the lower transfer relay 504 is operated. In case any of the numeral push bar springs are operated during the time the upper transfer relays are operated, then the punch magnets associated with the upper field are the only magnets operated. The punch magnets in the upper field comprising magnets 12, 11, 10, 1, 2, and 3.

Trip intermediate

In response to the closure of Trip Inter. push bar springs, the trip magnet 518, the cancel relay 513, and the intermediate stop relay 512 are operated. The right-hand springs connect positive battery to conductor 22 to energize the trip magnet 518 and the left-hand springs connect positive battery to cancel conductor 19 to energize cancel relay 513. The closure of the middle springs connect positive battery to intermediate stop conductor 18 and through the upper winding of relay 512 to negative battery. The operation of trip magnet 518 and cancel relay 513 cause the same operations as described under the Trip function with the exception that the carriage is stopped in its intermediate stop position, instead of in its marginal stop position. This is accomplished by the operation of relay 512 which, at armature 572, prepares the circuit for the intermediate stop magnet 18 and at armature 573 locks itself through the stop bar springs 403. Now when the cam springs 586 close and energize carriage return relay 511 as previously described, said relay at armature 569 completes the circuit for operating the intermediate stop magnet 18 as follows: from positive battery, stop springs 403, conductor 606, armature 569, armature 572, conductor 588, and through the winding of intermediate stop magnet 18 to negative battery. In response to the operation of magnet 18, the intermediate stop 419 (Fig. 14) is rotated to engage bar 444 so as to stop the return of the carriage in this position by opening stop bar springs 403, which opens the circuits to the intermediate stop and cancel magnets 18 and 19, the carriage return clutch 520, and the carriage return, intermediate and cancel relays 511, 512, and 513. Card check relay 514 operates in the same manner as previously described and, upon deenergizing, again reestablishes the circuit for the tape translator clutch 500.

Carriage return

In response to the closure of the Car. Ret. push bar springs, positive battery is connected to cable conductor 20 to cause the energization of carriage return relay 511. Relay 511 at armature 568 opens a point in the locking circuit to skip relays 505 and 506, at armature 569 completes the previously traced circuit for energizing the carriage return magnetic clutch 520 by way of stop bar springs 403, at armature 570 completes its locking circuit, and at armature 571 operates card check relay 514 and opens the circuit to the tape translator clutch magnet 500 as previously described. When the carriage is returned to its marginal stop position, stop bar springs 403 opens the locking circuit of relay 511 and the circuit of the magnetic clutch 520 to stop the carriage in this position. The card check relay 514 operates to perform the same functions as previously described. This operation has resulted in returning the carriage to its marginal stop position without erasing or releasing any of the set-up bars, which may be operated at this time, since the cancel magnet 19 was not operated during the return of the carriage.

Credit

In response to the closure of the credit push bar springs, the pulse conductor 43 is connected to the erase conductor 16 and cable conductor 10. In 45 column working, the connection of positive battery to pulse conductor 43 by the cam pulse springs of the translator causes the operation of punch magnet 10 over armatures 521 and 535 and their back contacts and the operation of both erase magnets 16 and 17 as previously described, for numerical operation. In case the "upper" relays 501 and 502 are operated, then the closure of the credit push bar springs completes circuits for punch magnet 12 by way of the front contact of armature 521 and for the upper erase magnet 16, since armature 532 of relay 502 has opened the circuit to the lower erase magnet 17. In case the "lower" relays 503 and 504 are operated, then the closure of the credit push bar springs completes circuits for punch magnet 4 by way of armature 521 and back contact and armature 535 and front contact and for the lower erase magnet 17, since armature 544 has opened the circuit to the upper erase magnet 16.

Intermediate Stop

In response to the closure of Inter. Stop push springs, positive battery is connected to cable conductor 18 to energize relay 512. The operation of relay 512 alone prepares the circuit to the intermediate stop magnet 18 at armature 572 and at armature 573 locks itself in operated position over stop bar springs 403. A subsequent operation of the carriage return relay 511, therefore, will cause the operation of intermediate stop magnet 18.

Cancel

In response to the closure of the Cancel push bar springs, positive battery is connected to the carriage return conductor 20 and to cancel conductor 19 to energize carriage return relay 511 and cancel relay 513. In the same manner as previously described, the operation of these relays complete the circuits for energizing the carriage return clutch 520 and cancel magnet 19 to cause the carriage to return to its marginal stop position, if the intermediate stop magnet 18 is not operated, and to cause any operated and locked set-up bars to be restored. This operation is similar to the trip function except, of course, that the card is not punched and ejected.

Cancel intermediate

In response to the closure of Cancel Inter. push bar springs, positive battery is connected to the carriage return conductor 20 at the right-hand operated springs, to intermediate stop conductor 18 at the middle springs, and to cancel conductor 19 at the left-hand springs to cause the energization of carriage return relay 511, intermediate stop relay 512, and cancel relay 513. The operations performed by these relays is the same as described under the intermediate stop and cancel functions to cause the carriage to be returned to its intermediate stop position and to cancel or restore any operated set-up bars in the step-up basket of the punch.

45 column

In response to the opening of 45 Col. push bar springs, positive battery is disconnected from cable conductor 40 to open the locking circuits to transfer relays 501 to 504, inclusive, in case the same are operated. This operation therefore converts the punch to 45 column working.

Lower

In response to the closure of the Lower push bar springs, positive battery is connected to "lower" conductor 42 to energize relays 503 and 504 over an obvious circuit. Relay 503, upon energizing, at armature 535 transfers cable conductor 10 from connection with punch magnet 10 to connection with punch magnet 4; at armature 536 transfers cable conductor 1 from connection with punch magnet 1 to connection with punch magnet 5; at armature 537 transfers cable conductor 2 from connection with punch magnet 2 to connection with punch magnet 6; at armature 538 transfers cable conductor 3 from connection with punch magnet 3 to connection with punch magnet 6; at armature 539 transfers cable conductor 4 from connection with punch magnet 4 to connection with punch magnet 6; and at armature 540 transfers cable conductor 5 from connection with punch magnet 5 to connection with punch magnet 7. Relay 504, upon energizing, at armature 541 transfers cable conductor 6 from connection with punch magnet 6 to connection with punch magnet 7; at armature 542 transfers cable conductor 7 from connection with punch magnet 7 to connection with punch magnet 8; at armature 543 connects cable conductor 39 to punch magnet 9; at armature 544 disconnects the erase conductor 16 from the upper erase magnet 16; at armature 545 opens a point in the locking circuit for the "upper" transfer relays 501 and 502; at armature 546 completes the locking circuit for itself and relay 503 by way of armature 533 and cable conductor 40 connected to positive battery at the 45 column push bar springs; and at armature 547 transfers the skip conductor 590 from connection with the upper skip magnet 14 to connection with the lower skip magnet 15. The operation of the "lower" transfer relays 503 and 504 has prepared the lower field punch magnets for operation to set the set-up bars in the lower field in order to punch a record card in its lower field when the numerical push bar springs are subsequently operated by the tape translator.

Upper

In response to the closure of the Upper push bar springs, positive battery is connected to the "upper" conductor 41 to energize the "upper" transfer relays 501 and 502. Relays 501 and 502 operate to prepare the operating circuits to the upper field punch magnets and to open the locking circuit of the "lower" transfer relays 503 and 504, if operated, in the same manner as described under the trip upper function.

Card carriage return intermediate

In response to the closure of Card Car. Ret. Inter. push bar springs, positive battery is connected to trip conductor 22 and to intermediate stop conductor 18 to energize trip magnet 518 and intermediate stop relay 512. The operation of trip magnet 518 causes the card in punching position to be punched and ejected and operates the carriage return relay 511 and carriage return clutch 520 to return the carriage as described under the trip function. However, since the cancel relay 513 and cancel magnet 19 are not operated at this time, and since the intermediate stop relay 512 and magnet 18 are operated, the carriage is returned to the intermediate stop position without releasing any operated and locked set-up bars.

Card carriage return

In response to the closure of Card Car. Ret. push bar springs, positive battery is connected to trip conductor 22 to energize trip magnet 518. The operation of trip magnet 518 alone causes the card in punching position to be punched and ejected and operates the carriage return relay 511 and carriage return clutch 520 to return the carriage to its marginal stop position without releasing any operated and locked set-up bars as previously described.

Card

In response to the closure of Card push bar springs, positive battery is connected to card conductor 23 and to trip conductor 22 to energize card relay 509 and trip magnet 518. Card relay 509, upon energizing, at armature 561 completes a locking circuit for itself by way of conductor 604, springs 585, and key springs 596; at armature 562 opens the circuit to carriage return relay 511 to prevent its operation during the rotation of the punch cam shaft; and at armature 563 opens the circuit to the clutch magnet 500 of the translator at its back contacts and at its front contacts completes the energizing circuit for the card check relay 514. The operation of the trip magnet 518 causes the card in punching position to be punched and ejected, but since the circuit through cam springs 586 for operating the carriage return relay 511 is opened at armature 562 of relay 509, the punch carriage is not returned to either of its stop positions. This operation therefore merely punches a card and ejects it and then inserts a new card in punching position without changing any of the operated set-up bars.

Carriage return intermediate lower

In response to the closure of the Car. Ret. Int. Lower push bar springs, positive battery is connected to intermediate stop conductor 18, to carriage return conductor 20, and to "lower" conductor 42 to energize intermediate stop relay 512, carriage return relay 511, and "lower" transfer relays 503 and 504. The operation of relays 511 and 512 cause the operation of carriage return clutch 520 and intermediate stop magnet 18 and the return of the carriage to intermediate stop position without restoring any operated and locked set-up bars in the same manner as previously described. The operation of the "lower" transfer relays 503 and 504 prepare the lower field magnets for operation.

Erase

In response to the closure of the Erase push bar springs, the pulse conductor 43 is connected to the erase conductor 16 and to the space conductor 13 to cause the operation of the space and erase magnets when positive battery is connected to pulse conductor 43 by the translator pulse springs. For 45 column working both erase magnets 16 and 17 are operated, for 90 column working in the upper field, only the upper erase magnet 16 is operated, and for 90 column working in the lower field, only the lower erase magnet 17 is operated. The operation of these erase magnets release any previously operated set-up bars in the proper fields and in the row directly below the plungers of the carriage as previously described. The operation of the universal bar 43 by space magnet 13 steps the carriage and plungers over the next row of set-up bars.

Back space

In response to the closure of the Back Space push bar springs, positive battery is connected to back space conductor 26 to energize back space relay 507 over an obvious circuit. Relay 507, upon energizing, at armature 554 completes a locking circuit for itself by way of armature 558, at armature 555 prepares a locking circuit for relay 508, at armature 556 opens the circuit to translator clutch magnet 500 and closes the circuit to relay 514 as previously traced, and at armature 557 completes a circuit for energizing the back space magnetic clutch by way of armature 560 and conductor 615. The operation of the back space magnetic clutch 519 steps the carriage back one step and closes springs 402 and 401. Springs 402 connect positive battery to conductor 603 to maintain relay 507 in operated position after relay 508 energizes. Springs 401 connects positive battery to conductor 608 to energize relay 508. At armature 558 relay 508 opens the first locking circuit of relay 507, which is now held over operated springs 402; at armature 559 completes a locking circuit for itself from armature 555, and at armature 560 opens the circuit to the back space magnetic clutch 519. In response to the deenergization of clutch 519, arms 483 and 484 return to normal to open springs 401 and 402. Springs 401 opens the original energizing circuit to relay 508 and springs 402 opens the locking circuit to relay 507 to deenergize the latter relay. At armature 555 relay 507, upon deenergizing, opens the locking circuit of relay 508 which thereupon deenergizes. The operation of the back space push bar springs have caused the carriage of the punch to be back spaced one step.

Carriage return lower

In response to the closure of the Car. Ret. Lower push bar springs, positive battery is connected to the "lower" conductor 42 and to the carriage return conductor 20 to energize "lower" transfer relays 503 and 504 and carriage return relay 511. The operation of relays 503 and 504 prepares the circuits for operating the lower field punch magnets and the operation of carriage return relay 511 causes the carriage to be returned to the marginal stop without restoring any operated set-up bars as previously described.

Carriage return intermediate

In response to the closure of the Car. Ret. Inter. push bar springs, positive battery is connected to intermediate stop conductor 18 and to carriage return conductor 20 to energize intermediate stop relay 512 and carriage return relay 511. The operation of relays 511 and 512 cause the carriage to be returned to its intermediate stop position without restoring any operated set-up bars in a manner apparent from the foregoing descriptions.

Skip (tab)

In response to the closure of Skip (tab) push bar springs, positive battery is connected to skip conductor 14 for energizing skip relay 505 by way of normally closed springs 482, conductor 610, and the winding of relay 505 to negative battery. Relay 505, upon energizing, at armature 548 completes a circuit for operating the upper skip magnet 14 or the lower skip magnet 15 by way of armature 577, conductor 590, armature 547 and back contact to upper skip magnet 14, in case relay 504 is not operated, or by way of armature 547 and front contact to the lower skip magnet 15, in case relay 504 is operated. At armature 549 relay 505 locks itself to skip stop springs 405 by way of armature 568 and conductor 602, and at armature 550 opens the circuit to the translator clutch magnet 500 and energizes card check relay 14. In response to the operation of the skip magnet, the carriage is released and skips to the next set skip stop as previously described. When the carriage is stopped by this skip stop, bar 407 opens the locking circuit to skip relay 505, which thereupon deenergizes after an interval. Relay 505, upon deenergizing, at armature 548 opens the circuit to the operated skip magnet which deenergizes and permits the stop bar 407 to close springs 405. In response to the operation of the skip push bar springs, the carriage has been skipped to the next skip stop position for upper or lower field working dependent upon the operated condition of relay 504. In case the carriage of the punch is in its 46th position when the skip push bar springs are operated, then relay 515, instead of relay 505, is operated from skip conductor 14 by way of closed springs 481, conductor 607, and the lower winding of relay 515 to negative battery. Relay 515, upon energizing, at armature 577 opens the circuit to the skip magnets 14 and 15, at armature 578 connects positive battery to "lower" conductor 42 to energize relays 503 and 504, at armature 583 locks itself to the closed stop bar springs 403, at armature 581 completes a circuit for energizing carriage return relay 511, at armature 582 completes a circuit for energizing intermediate stop relay 512, and at armature 584 opens the circuit to the translator clutch magnet 500. The operation of the carriage return relay 511 and the intermediate stop relay 512 cause the carriage of the punch to be returned to its intermediate stop position without releasing any operated set-up bars. When the carriage reaches its intermediate stop position as previously described, springs 403 opens the locking circuits of relays 515, 512, and 515 and the circuit of clutch 520. Relay 515, upon deenergizing, at armature 578 opens the energizing circuit of relays 503 and 504 which, however, are locked energized over conductor 40, at armatures 581 and 582 opens the circuits to relays 511 and 512, and at armature 584 prepares the circuit to the translator clutch 500, which circuit will be completed by the deenergization of relay 514 in the usual manner. The closure of the skip push bar springs at a time the carriage of the punch is resting in its 46th position, therefore, causes the carriage to be returned to intermediate stop position without releasing any set-up bars and causes the "lower" transfer relays 503 and 504 to be operated to prepare the circuits for operating the lower field magnets. This last operation of the punch enables corrections to be made in the bookkeeping entry sheet and perforated in the tape so that such corrections may be translated to operate the punch to likewise make corrections before the carriage of the punch is returned to one of its stop positions. In case the carriage is automatically returned to one of its stop positions as a result of stepping to its 46th position, then no provision is made for any corrections in the operated set-up bars in the first field in the punch, and it would be necessary to release the entire set up and start all over again.

Space

In response to the closure of the Space push bar springs, pulse conductor 43 is connected to space conductor 13 to cause the operation of space magnet 13 when the pulse springs of the translator connects positive battery to conductor 43. The operation of space magnet 13 causes the carriage to be moved one step by operating the universal bar without operating any set-up bars.

Trip 2

In response to the closure of Trip 2 push bar springs, positive battery is connected to trip 2 conductor 21 and to cancel conductor 19 to energize trip relay 510 and cancel relay 513. Cancel relay 513 at armature 574 prepares the circuit for cancel magnet 19 and at armature 575 locks itself to springs 403. Trip 2 relay 510, upon energizing, at armature 564 completes the circuit for energizing receiver shift magnet 517 by way of conductor 601, at armature 565 connects positive battery to trip conductor 22 to operate the trip magnet 518, at armature 566 completes a locking circuit for itself by way of conductor 604, cam springs 585, and springs 596 to positive battery, and at armature 567 opens the circuit to the carriage return relay 511 so that the first rotation of the punch cam shaft will not operate relay 511. The operation of receiver shift magnet 517 shifts the card receiving mechanism in a manner similar to that disclosed in the Lasker Patent #1,868,111 to cause the first card punched to be discharged into an auxiliary card hopper. The operation of trip magnet 518 causes the card in punching position to be punched and ejected into the auxiliary card hopper, a new card to be set in punching position, and the operation of the punch cam shaft. The closure of springs 586, on the first rotation of the cam shaft, are ineffective for operating carriage return relay 511 because the circuit to this relay is open at this time at armature 567. The first opening of cam springs 585 opens the locking circuit of trip 2 relay 510 which accordingly deenergizes. At armature 564 relay 510 opens the circuit to the receiver shift magnet 517 to release this magnet so that the second card punched will be discharged into the regular card hopper. At armature 565 relay 510 opens the circuit to the trip magnet 518 which deenergizes, but not soon enough to stop the cam shaft on its first revolution, and therefore the cam shaft is allowed to complete two revolutions in response to the energization of relay 510. At armature 567 relay 510 prepares the circuit for carriage return relay 511 which is operated when cam springs 586 close on the second revolution of the cam shaft. Relay 511, upon energizing, completes the circuits for operating the cancel magnet 19 and the carriage return magnetic clutch 520 to cause the cariage to be returned to its marginal stop position and the operated set-up bars to be restored as previously described. The closure of trip 2 push bar springs has resulted in the punch punching two cards with the same perforations after which the set-up bars have been restored.

The card check relay 514 is operated whenever anyone of the following relays 505, 506, 507, 509, 511, and 513 are operated in order to open the circuit to the translator clutch magnet 500 and delay the operation of the translator until the punch is ready to receive the following translation.

Keyboard Operation

The Powers keyboard (Figs. 14B and 22) comprises three sets of keys for operating the punch for both 45 and 90 column working. Fig. 22 shows a bottom view of the wiring connections of the spring combinations operated by these keys. These springs are connected by conductors extending in a cable to the jack connections illustrated by the full black circles. These conductors are numbered in accordance with the jack connections such conductors terminate in, as for example, the conductor 713, connected to the space springs, terminates in jack connection 713. The right-hand spring sets, shown to the right of the dotted line in Fig. 22, including the erase, skip, 0, space, 1, 2, 3, 11, 4, 5, 6, 12, 7, 8, and 9 springs, together with some of the function springs are used for 45 column working and, as will be seen upon inspection of the drawings, are connected through the jack connections to the punch magnets and function relays to operate the punching machine in accordance therewith. The middle spring sets, between the dotted lines in Fig. 22, including the upper erase, upper skip, 0, space, and the digit springs 1 to 9, inclusive, with the function springs are used to operate the punch to punch a card in its upper field while the remaining spring sets are used to punch a card in its lower field.

The keyboard springs are connected through the jack connections direct to the punch magnets 1 to 12, inclusive, and function magnets 13, 16, and 17 to operate these magnets singly or in code combinations as indicated by the reference characters of the conductors terminating in the spring sets of the respective keys. For example, the closure of digit 1 spring set, for 45 column working, closes circuits to magnets 1, 16, and 17 as indicated by conductors 701, 716, and 717 connected thereto; for upper field working, digit 1 spring set closes circuits for magnets 11 and 16 as indicated by conductors 711 and 716: and for lower field working, digit 1 spring set closes circuits for magnets 5 and 17 as indicated by conductors 705 and 717. As previously stated, it will be understood that similarly numbered full black circles, indicating the jack conections, are connected together to enable the punch to be controlled from the key board.

Assuming now that a punch operator desires to punch cards by operating the keys of the keyboard, such operator will operate the key K3 (Fig. 21) to operate the motor generator set and will operate key K4 (Fig. 21) to close springs 591, 592, 593, and 594. Springs 591 connect the carriage return magnetic clutch 520 to jack connection 725 and is ineffective as long as the stop key of Fig. 22 is in margin stop position. Springs 592 connects positive battery to jack connection 736 by way of conductor 616 and to jack connection 732 by way of armature 580. Springs 593 connects jack connection 734 to conductor 614 and, since the repeat key in Fig. 22 is in the position shown, then jack connections 734 and 736 are connected together by conductors 734 and 736 with the result that positive battery is connected to conductor 614 and conductors 734 and 736 by the operation of springs 592 and 593. Springs 594 connects jack connection 733 to conductor 613 and, if relays 505, 506, 507, 509, 511, 513, and 514 are in their normal unoperated positions, then conductor 613 is connected through armatures of these relays to conductor 614 which, as previously stated, is connected to positive battery through springs 593, jack connections and conductors 734 and 736, to conductor 616 and springs 592. The operation of key K4 to keyboard position may be summarized as resulting in: positive battery being connected to conductor 732 in the key springs by way of springs 592 and armature 580 of relay 514; positive battery being connected to conductor 736 in the key springs by way of springs 592; and positive battery being connected to conductor 733 in the key springs by way of springs 592, 593, the chain of armatures connecting conductor 614 to conductor 613, and springs 594. Positive battery is therefore connected to conductor 732 dependent upon the operated condition of card check relay; positive battery is directly connected to conductor 736; and positive battery is connected to conductor 733 dependent upon the operated condition of any one of the previously mentioned chain of armatures. Therefore, in describing the circuits completed by the closure of the key springs, such circuits will be traced starting with conductors 732, 733, and 736 and it will be understood that these conductors are connected to positive battery over the circuits just traced.

Assuming now that the right-hand digit key 1 is operated, then these springs are operated and positive battery on conductor 733 is connected to conductors 701, 716, and 717, thereby energizing punch magnet 1 and erase magnets 16 and 17. The operation of these magnets cause, the release of any operated set-up bars in the row directly below the plungers of the carriage, the #1 set-up bar in this row to be operated and locked, and the carriage to be stepped to the next row as previously described. In case the middle digit key 1 is operated, then these springs are operated to connect conductor 733 to conductors 711 and 716 to operate punch magnet 11 and the upper erase magnet 16 thereby causing the release of any set-up bars in the upper field of the set basket and the operation of the number 11 set-up bar in the row directly below the plungers of the carriage. In case the left-hand digit key 1 is operated, then these springs are operated to connect conductor 733 to conductors 705 and 717 to operate punch magnet 5 and lower erase magnet 17 thereby causing the release of any operated set-up bars in the lower field and the operation of number 5 set-up bar in the row directly below the plungers of the carriage as previously described. The remaining numerical springs close circuits for operating the punch magnets in accordance with the last two numbers of the reference characters applied to the conductors terminating in these springs.

The operation of the function keys causes the punch to perform operations similar to that described under the function operations controlled by the tape translator and therefore it will suffice to trace only the circuits to the function relays and magnets since the operations performed by these relays and magnets are the same as previously described regardless of the point from which they are controlled.

The operation of the trip key connects positive battery by way of conductor 736 to conductors 722 and 719 and jack connections 722 and 719 and to conductors 22 and 19 to energize trip magnet 518 and cancel relay 513.

The operation of the trip intermediate key connects positive battery by way of conductor 732 to conductors and jack connections 722, 719, and 718 to energize trip magnet 518, cancel relay 513, and intermediate stop relay 512 through its lower winding.

The closure of carriage return key springs C. R. connects positive battery by way of conductor 732 to conductor 20 by way of conductor and jack connection 720 to energize carriage return relay 511.

The closure of cancel key springs connects positive battery by way of conductor 732 to conductors 20 and 19 by way of conductors and jack connections 720 and 719 to energize carriage return relay 511 and cancel relay 513.

The closure of card carriage return key springs Card. C. R. connects positive battery by way of conductor 732 to trip conductor 22 by way of conductor 722 and jack connection 722 to energize trip magnet 518.

The closure of card key springs connects positive battery by way of conductor 732 to conductors 22 and 23 by way of conductors and jack connections 722 and 723 to energize trip magnet 518 and card relay 509.

The closure of the erase key springs connects positive battery by way of conductor 733 to conductors and jack connections 713, 716, and 717 to energize the space and the upper and lower erase magnets 13, 16, and 17.

The closure of upper erase key springs connects positive battery by way of conductor 733 to conductors 713 and 716 to energize the space and upper erase magnets 13 and 16.

The closure of the lower erase key springs connects positive battery by way of conductor 733 to conductors 713 and 717 to energize the space and lower erase magnets 13 and 17.

The closure of the back space key springs connects positive battery by way of conductor 732 to conductor 26 by way of conductor 726 and jack connections 726 to energize back space relay 507.

The closure of the carriage return intermediate key springs C. R. Int. connects positive battery by way of conductor 732 to conductors 18 and 20 by way of conductors and jack connections 718 and 720 to energize relays 512 and 511.

The closure of any one of the space key springs connects positive battery by way of conductor 733 to conductor 713 to energize space magnet 13.

The closure of the trip 2 key springs connects positive battery by way of conductor 732 to trip 2 conductor 21 and cancel conductor 19 by way of conductors and jack connections 721 and 719 to energize trip 2 relay 510 and cancel relay 513.

The closure of the skip (tab) key springs connects positive battery by way of conductor 736 to conductor 610 to energize skip relay 505 by way of conductor 714 and jack connection 714.

The closure of the upper skip (tab) key springs also energizes skip relay 505 over the same circuit as for the skip key springs.

The closure of the lower skip (tab) springs connects positive battery from conductor 736 to jack connection 715 by way of conductor 715 to energize relay 506. Relay 506, upon energizing, at armature 551 connects positive battery to conductor 587 for energizing lower skip magnet 15; at armature 552 locks itself to (tab) skip bar springs 405 by way of armature 568 and conductor 602, and at armature 553 completes the circuit to energize card check relay 514 at its front contacts, and at its back contacts, disconnects positive battery from conductor 733 to render certain of the keys ineffective to operate the punch. The card check relay at armature 579 also disconnects positive battery from conductor 733 and at armature 580 disconnects positive battery from conductor 732 to render certain of the function keys ineffective to operate the punch. Since relay 514 is energized, as previously described, in response to the majority of function operations performed by the punch, then most of the key springs are ineffective to control the punch until after the punch has performed its function, after which, the card check 514 is de-energized to connect positive battery to the key springs to render such springs active.

Although the invention has been described in connection with a single tape translator and card punch which produces punched cards from the tapes perforated by a number of combined bookkeeping typewriter machines and tape perforators, for economical purposes, it will be understood that, if desired, the tape produced by the tape perforator could be fed directly to the tape translator. In this latter arrangement, the tape would only be fed to the translator at a time when the tape between the perforator and translator was slack. In case the translator in operating takes up all the slack than the translator is rendered inoperative by opening the control circuit until further slack appears in the tape. This is a well-known arrangement used in telegraph systems such as disclosed in Patents 1,174,236, 1,192,171, and 1,366,812.

What is claimed is:

1. In a recording system for use in accounting, the combination of a typewriter, a tape perforator, a tape translator, and a card punch, electrical connections connecting the typewriter and tape perforator, electrical connections connecting the tape translator and card punch, circuits completed over said first electrical connections by the operation of said typewriter for electrically and automatically operating said tape perforator to punch a tape with coded data perforations corresponding to the data struck on the typewriter keys, means in said tape translator for sensing the coded data perforations in said tape, and circuits completed over the second of said electrical connections in accordance with said sensed coded data perforations in the tape for electrically and automatically operating said card punch to punch a record card with corresponding data perforations.

2. In a recording system for use in accounting, the combination of a typewriter, a tape perforator, a tape translator and a card punch, electrical connections connecting the typewriter and tape perforator, electrical connections connecting the tape translator and card punch, means in the typewriter for typing data on a sheet, means in the typewriter responsive to said typing for transmitting impulses over said first connections in accordance with said typed data to said tape perforator, means in said tape perforator responsive to said transmitted impulses for operating said perforator to perforate a tape in code in accordance with said typed data, means in said tape translator for sensing the coded perforations in said tape, means in said translator operated in accordance with said sensed perforations for transmitting impulses over the second of said connections to said card punch, and means in said punch responsive to said last transmitted impulses for operating said card punch to punch a record card corresponding to the data perforations in said tape.

3. In a recording system, a typewriter, a tape perforator, electrical connections connecting the typewriter and perforator, tabulation skip springs in said typewriter, means responsive to the operation of said skip springs for transmitting a skip impulse to said tape perforator over said connections, means in said perforator responsive to said skip impulse for punching a coded skip perforation in a tape, a palm skip tabulator in said typewriter for causing the carriage of the typewriter to skip to a predetermined position, a plurality of decimal tabulation keys in said typewriter for causing the carriage of the typewriter to skip to a particular one of a number of different predetermined positions dependent upon the particular decimal tabulation key operated, and means operated in response to the operation of said palm skip tabulator or any one of said decimal tabulation keys for operating said skip springs.

4. In a recording system, a typewriter, a tape perforator connected to said typewriter, a palm skip tabulator in said typewriter for causing the carriage of the typewriter to skip to a predetermined position, a plurality of decimal tabulation keys in said typewriter for causing the carriage of the typewriter to skip to a particular one of a number of different predetermined positions dependent upon the particular decimal tabulation key operated, and means responsive to the operation of said palm skip tabulator or any one of said decimal tabulation keys for operating said tape perforator to punch a coded skip perforation in a tape.

5. In a recording system, the combination of a recording machine having a carriage, and a tape perforator controlled by the recording machine: means traveling with the carriage of the machine for repeatedly making and breaking the connection to the perforator, a relay in said machine, means for operating said relay in response to the first making of said connection, means for maintaining said relay in operated position, means for operating the carriage to skip to a predetermined position, and means operated in response to this skip operation for operating the tape perforator to punch a coded skip perforation in a tape in case said relay is in operated position irrespective of the condition of said connection.

6. In a recording system, the combination of a recording machine having a carriage, and a tape perforator controlled by the recording machine, means traveling with the carriage of the machine for repeatedly making and breaking the connection to the perforator, locking means in said machine operated in response to the first making of said connection, means for operating the carriage to skip to a predetermined position, and means operated in response to this skip operation for operating the tape perforator to punch a skip perforation in a tape in case said locking means is operated irrespective of the condition of said connection.

7. In a recording system, the combination of a recording machine having a carriage, and a tape perforator controlled by the recording machine, means traveling with the carriage of the machine for repeatedly making and breaking the connection to the perforator, locking means in said machine operated in response to the first making of said connection, means for operating the carriage to skip to a predetermined position, means operated in response to this skip operation for operating the tape perforator to punch a skip perforation in a tape in case said locking means is operated irrespective of the condition of said connection, and means for thereafter releasing said locking means.

8. In a recording system, a recording machine having a carriage for making a record on a sheet, a tape perforator controlled by said machine to perforate a tape with a corresponding record, a credit shift key in said machine for altering the operation of said machine to make a credit record instead of a debit record when operated, and means traveling with said carriage for operating said tape perforator to automatically punch a credit perforation in the tape after the record perforations only in case said key is operated.

9. In a recording system, a recording machine, a tape perforator controlled by said recording machine to perforate a tape, keys in said recording machine, means responsive to the operation of said keys for operating said recording machine to make a record on a sheet and for operating said perforator to punch a tape with coded perforations corresponding to the actuated keys, a key-locking magnet in said recording machine, and means for operating said magnet to lock said keys against operation dependent upon the condition of said tape.

10. In a punching machine, a plurality of relays operable in accordance with impulses transmitted thereto, a trip magnet operable in combination with said relays for punching a record with perforations in accordance with the relays actuated, a hold relay, a circuit for said trip magnet controlled by any operated one of said code relays and by said hold relay, a circuit for said hold relay initially controlled by the punching operation, a locking circuit for said hold relay controlled by any operated one of said code relays, and holding circuits for said code relays controlled by said hold relay.

11. In a tape perforator, a continually rotating shaft, a punch shaft, a trip magnet operated for coupling said continually rotating shaft to said punch shaft, a plurality of code relays operable in accordance with coded impulses transmitted thereto, means operated by said code relays in combination with the rotation of said punch shaft for punching a tape with perforations corresponding to the relays operated, a hold relay, a circuit for said trip magnet controlled by any operated one of said code relays and by said hold relay, a circuit for said hold relay initially controlled by the rotation of said punch shaft, a locking circuit for said hold relay controlled by said relay and any operated one of said code relays, and holding circuits for said code relays controlled by said hold relay.

12. In a tape perforator, a motor driven shaft, a cam shaft, a clutch for coupling said shafts, a trip magnet for controlling said clutch, individual punches, a code relay for each punch, a bar controlled by each relay, means for operating any of said relays to project their bars below their corresponding punches, means for operating said trip magnet to couple said shafts in response to the operation of any one of said relays, a punching anvil operated by said cam shaft to engage and raise the operated ones of said bars to operate the corresponding punches to perform a punching operation, and means controlled by said cam shaft for restoring said operated relays and said trip magnet to uncouple said shafts.

13. In a tape perforator, a motor driven continually rotated shaft, a cam shaft, a clutch for coupling said shafts, a trip magnet for controlling said clutch, individual punches, a code relay for each punch, a bar on each relay projectable below its corresponding punch in response to its corresponding relay operation, a punching anvil operative to engage and raise the operated ones of said bars, and a cam on said cam shaft for operating said anvil.

14. In a tape perforator, a motor driven continually rotated shaft, a cam shaft, a clutch for coupling said shafts, a trip magnet for controlling said clutch, punches, a punching anvil, tape feeding mechanism, a plurality of code relays one for each punch, a bar on each relay and projectable below a particular one of said punches and above said anvil in response to its corresponding relay operation, and cams on said cam shaft for operating said anvil and said tape feeding mechanism.

15. In a recording system, a card punch for punching a record card, a keyboard having a large number of control contacts on said punch for manually controlling the operation of said punch, a tape translator connected to said punch, said translator having means for translating coded perforations in a tape, said translating means including a small number of sensing pins and a greater number of control contacts, said sensing pins mechanically operated by the perforations in the tape to control said means to translate the operations of said sensing pins into mechanical operations of said control contacts, means controlled by the operated contacts of said translating means for automatically controlling said punch to punch a record card corresponding to the coded perforations in the tape, means controlled by the manual operation of the keys and corresponding control contacts in the keyboard for operating said punch to punch a record card in accordance with the actuated keys, and means in said punch for switching the control of said punch from the keyboard to said translator.

16. In a recording system, a card punch for punching a record card, transfer relays in said punch for converting the punch from standard punch operation to coded punch operation by dividing the punching mechanism into two separably operable units to record data in code, a tape translator, means in said translator for translating coded data perforations in a tape, means for operating said transfer relays in response to the translation of certain data perforations, and means in the punch operated in response to other translations for punching a card in accordance with standard punch operation or in accordance with coded punch operation dependent upon the operated condition of said transfer relays.

17. In a recording system, a card punch having a punching mechanism comprising two separate operable units for punching a record card, transfer relays corresponding to said units, a tape translator connected to said punch, a tape perforated with coded data perforations for controlling said translator, means in said translator for translating the coded perforations in said tape, means for operating said transfer relays in accordance with certain of said translations, and means responsive to other translations for operating both punching units as a unitary structure to punch a record card with non-coded perforations in case none of said transfer relays are operated and for operating said punching units separately dependent upon the operated condition of said transfer relays to punch a card with coded perforations in case some of said transfer relays are operated.

18. In a recording system, a card punch having a carriage movable from normal position one step at a time in response to each punch setting operation, skipstop means in said punch for moving said carriage a predetermined distance equal to a plurality of steps, a tape translator connected to said punch, a tape perforated with coded data perforations, means in the translator for translating the coded data perforations on said tape, means responsive to a skip stop translation for operating said skip stop means, means for operating the carriage one step and said punch in a punch setting operation for each of the other translations, carriage return means for returning the carriage to its normal position, and means responsive to a skip stop translation at a time when the carriage has reached its end stepping position for automatically operating the carriage return means.

19. In a recording system, a card punch operable in punch setting operations and in function operations to punch a card, a tape translator connected to said punch, a tape perforated with coded perforations corresponding to numerical data and different punch functions, means in said translator for translating said coded perforations, said translating means including a small number of sensing pins and a greater number of control contacts, said sensing pins mechanically operated by the perforations in said tape to control said means to translate the operations of said sensing pins into mechanical operations of said control contacts, means responsive to the operation of said control contacts of said translating means for operating said punch in accordance with said coded perforations, and means for rendering the tape translator inoperative during a function operation of said punch.

20. In a recording system, a card punch, a carriage in said punch, a first and a second normal position for said carriage, means for moving said carriage from either position in a punch setting operation, a carriage return magnet in said punch for returning said carriage to either normal position, an intermediate stop magnet in said punch for causing said carriage to stop during its return operation in its second normal position, an intermediate stop relay, a carriage return relay, said carriage return magnet operated by said carriage return relay, said intermediate stop magnet operated jointly by said carriage return relay and said intermediate stop relay, and means for operating said relays.

21. In a recording system, a card punch, punch setting mechanism in said punch, a carriage in said punch movable from normal position for controlling said mechanism, means including a carriage return magnet in said punch for returning said carriage to normal position, a cancel magnet in said punch for restoring said punch setting mechanism during the return of said carriage, a cancel relay in said punch for controlling said cancel magnet, a carriage return relay, means for energizing said cancel relay, means for energizing said carriage return relay, said carriage return relay on energizing operating said carriage return magnet and said cancel magnet to return the carriage to normal position and to restore the punch setting mechanism.

22. In a recording system, a card punch, a carriage in said punch movable step-by-step in one direction during punch setting operations, means including a back-space magnetic clutch in said punch operable to move the carriage back one step in the opposite direction, a first and a second back space relay in said punch, means for energizing the first of said relays, means for energizing said clutch in response to the energization of said first relay to back space the carriage, a locking circuit for said first relay completed responsive to the operation of said clutch, means for energizing the second of said relays in response to the operation of said clutch, means for deenergizing said clutch in response to the operation of said second relay, a locking circuit for said second relay controlled by said first relay, the deenergization of the clutch opening the locking circuit to deenergize said first relay and the deenergization of the first relay opening the locking circuit to deenergize the second relay.

MARTIN L. NELSON.
LEITH JOHNSTON.